United States Patent
Strong et al.

(10) Patent No.: US 12,313,648 B2
(45) Date of Patent: May 27, 2025

(54) STRUCTURED-LIGHT VELOCIMETER AND VELOCIMETRY METHOD

(71) Applicants: THE REGENTS OF THE UNIVERSITY OF COLORADO, A BODY CORPORATE, Denver, CO (US); President and Fellows of Harvard College, Cambridge, MA (US)

(72) Inventors: Elizabeth F. Strong, Boulder, CO (US); Gregory B. Rieker, Boulder, CO (US); Juliet T. Gopinath, Boulder, CO (US); Alexander Anderson, Boulder, CO (US); Michael P. Brenner, Cambrdige, MA (US)

(73) Assignees: THE REGENTS OF THE UNIVERSITY OF COLORADO, A BODY CORPORATE, Denver, CO (US); President and Fellows of Harvard College, Cambridge, MA (US)

(*) Notice: Subject to any disclaimer, the term of this patent is extended or adjusted under 35 U.S.C. 154(b) by 122 days.

(21) Appl. No.: 17/998,262

(22) PCT Filed: May 10, 2021

(86) PCT No.: PCT/US2021/031573
§ 371 (c)(1),
(2) Date: Nov. 9, 2022

(87) PCT Pub. No.: WO2021/257203
PCT Pub. Date: Dec. 23, 2021

(65) Prior Publication Data
US 2023/0236215 A1    Jul. 27, 2023

Related U.S. Application Data

(60) Provisional application No. 63/161,368, filed on Mar. 15, 2021, provisional application No. 63/022,540, filed on May 10, 2020.

(51) Int. Cl.
*G01P 3/36* (2006.01)
*G01P 1/00* (2006.01)
(Continued)

(52) U.S. Cl.
CPC ............... *G01P 3/36* (2013.01); *G01P 1/06* (2013.01); *G01P 1/026* (2013.01); *G01P 5/20* (2013.01); *G01S 17/58* (2013.01)

(58) Field of Classification Search
CPC .... G01P 3/36; G01P 1/06; G01P 1/026; G01P 5/20; G01P 3/481; G01P 5/26; G01S 17/58
See application file for complete search history.

(56) References Cited

U.S. PATENT DOCUMENTS

| | | | | |
|---|---|---|---|---|
| 4,385,830 A | * | 5/1983 | Webb | G01P 3/36 356/28 |
| 5,905,568 A | * | 5/1999 | McDowell | G01P 3/38 356/28 |

(Continued)

OTHER PUBLICATIONS

PCT/US2021/031573 International Search Report and Written Opinion dated Jan. 31, 2022, 7 pages.
(Continued)

*Primary Examiner* — Jonathan M Hansen
(74) *Attorney, Agent, or Firm* — Cozen O'Connor

(57) ABSTRACT

A structured-light-velocimetry method includes extracting one or more bursts from a time-varying signal generated by detecting scattered light from a tracer particle passing through a structured optical beam; fitting each of the one or more bursts to a multi-variable model to extract a plurality of fitted parameters; and executing a machine-learning model with the plurality of fitted parameters to predict an angular velocity of the tracer particle.

18 Claims, 13 Drawing Sheets

(51) Int. Cl.
    *G01P 1/02* (2006.01)
    *G01P 5/20* (2006.01)
    *G01S 17/58* (2006.01)

(56) References Cited

U.S. PATENT DOCUMENTS

| | | | |
|---|---|---|---|
| 6,603,535 B1* | 8/2003 | McDowell | G01P 5/001 |
| | | | 356/28 |
| 10,598,682 B2* | 3/2020 | Dantus | G01P 5/001 |
| 2018/0246137 A1 | 8/2018 | Heidrich et al. | |
| 2018/0267072 A1* | 9/2018 | Dantus | G01N 21/645 |

OTHER PUBLICATIONS

Strong, E.F. "Angular velocimetry for fluid flows: an optical sensor using structured light and machine learning" Optics Express, Mar. 29, 2021, vol. 29, Issue 7, pp. 9960-9980.

* cited by examiner

STRUCTURED-LIGHT VELOCIMETER AND VELOCIMETRY METHOD

CROSS-REFERENCE TO RELATED APPLICATIONS

This application benefits from and claims priority to U.S. provisional patent application Nos. 63/022,540 and 63/161,368, filed on May 10, 2020 and Mar. 15, 2021, respectively, the entire disclosures of each are incorporated herein by reference.

GOVERNMENT RIGHTS

This invention was made with government support under grant number FA9550-17-1-0224 awarded by the Air Force Office of Scientific Research, and under grant numbers 1715477, 1554704, DGE 1650115, DMR1553905, DMS-1715477, ECCS 1509733, ECCS 1509928, and ECCS 1554704 awarded by the National Science Foundation. The government has certain rights in the invention.

BACKGROUND

Measurement of fluid velocities is important in fields including environmental studies (e.g., water flow around coral reefs), biofluid dynamics (e.g., blood flow in arteries and the heart), aerodynamics (e.g., air flow through a jet engine), hydrodynamics, and architecture. Experimental techniques are critical for studying fluid flows, especially if the flows cannot be studied numerically due to physical restrictions or computational limitations. As such, velocity sensors are a primary class of diagnostic tool. Velocity sensors typically measure linear components of the velocity vector. Yet, many flows have important angular velocity components. In turbulent flows, for example, regions with elevated local angular velocities give rise to and mediate the most salient characteristics of the flow, including how and where energy is dissipated.

SUMMARY

Traditionally, the mismatch between what can be sensed (linear velocities) and what is of interest (angular velocities) has been addressed by deriving the latter from the former. For example, metrics such as vorticity and circulation that characterize the local rotation of flows are calculated by numerically differentiating measured multi-component linear velocity fields. However, such strategies come at the cost of resolution, as the numerical differentiation inherently introduces spatial uncertainty. While increasing the density of the field samples can increase the spatial resolution, increasing the number of samples comes the cost of reduced temporal resolution. Thus, if a high degree of temporal resolution is required, poor spatial resolution may result.

To refine the spatial and temporal resolutions of measurements that quantify rotation, we seek to measure a component of the angular velocity field without needing to first measure components of the linear velocity fields. This direct strategy facilitates measurements with both short temporal and small spatial resolutions, positioning the measurements well for studying flows that change rapidly in both time and space.

Embodiments disclosed herein implement angular-velocity sensing of a tracer particle for use with structured-light velocimetry. Unlike conventional approaches to particle-tracking velocimetry where the tracer particle is illuminated by a Gaussian or flat-top optical beam to measure linear velocity, in the present embodiments the tracer particle is illuminated by an optical beam that has transverse structure (e.g., angular fringes) of varying intensity that modulate the amount of light scattered by the tracer particle as it traverses the optical beam. The modulated light gives rise to a time-varying electrical signal that can be processed to estimate kinematic quantities, such as an angular velocity, of the tracer particle when it moves in a circular arc.

In some embodiments, a machine-learning model is used to generate the angular-velocity estimate from the time-varying electrical signal. More specifically, fit parameters obtained by fitting "bursts" of the time-varying electrical signal to a multi-variable model are inputted to the machine-learning model. The machine-learning model is pretrained using training data generated via computer simulations of the tracer particle's circular motion.

Embodiments disclosed herein may be advantageously used for any application that can benefit from additional knowledge of a tracer particle's angular velocity. In particular, measuring angular velocities at small length scales is important for further understanding of turbulence. As such, applications include environmental studies (e.g., water flow around coral reefs), biofluid dynamics (e.g., blood flow in arteries and the heart), aerodynamics (e.g., air flow through a jet engine), hydrodynamics, and architecture.

DETAILED DESCRIPTION

Embodiments of velocimeters described herein include seeding the flow with small particles that scatter light. Assuming the particles are sized properly so they travel faithfully with the flow, their velocities are assumed to match the velocity of the fluid flow around them. When these particles pass through an optical probe beam, the light they scatter is imaged or collected on a photodetector. Information regarding the size, surface properties, and kinematics of the reflector as well as characteristics of the probe beam such as its intensity are encoded in the scattered signal and can be extracted using appropriate signal processing techniques.

Embodiments of velocimetry methods disclosed herein probe the fluid with structured light (i.e., light with engineered phase, polarization, and intensity profiles). In particular, we take advantage of structured light that is tailored to match particular properties we wish to measure (e.g., a radially symmetric pattern to measure angular velocity), while allowing for the resulting scattered light signals to be complicated with no simple relationship to the flow property (e.g., wavelength shift to velocity in laser Doppler velocimetry). To ascertain a correlation between these expected signals and the angular velocity, we train a machine-learning regression model to interpret the signals. We demonstrate this approach by measuring angular velocity using the interference of two conjugate beams that have non-zero orbital angular momentum (OAM).

Figure 1:
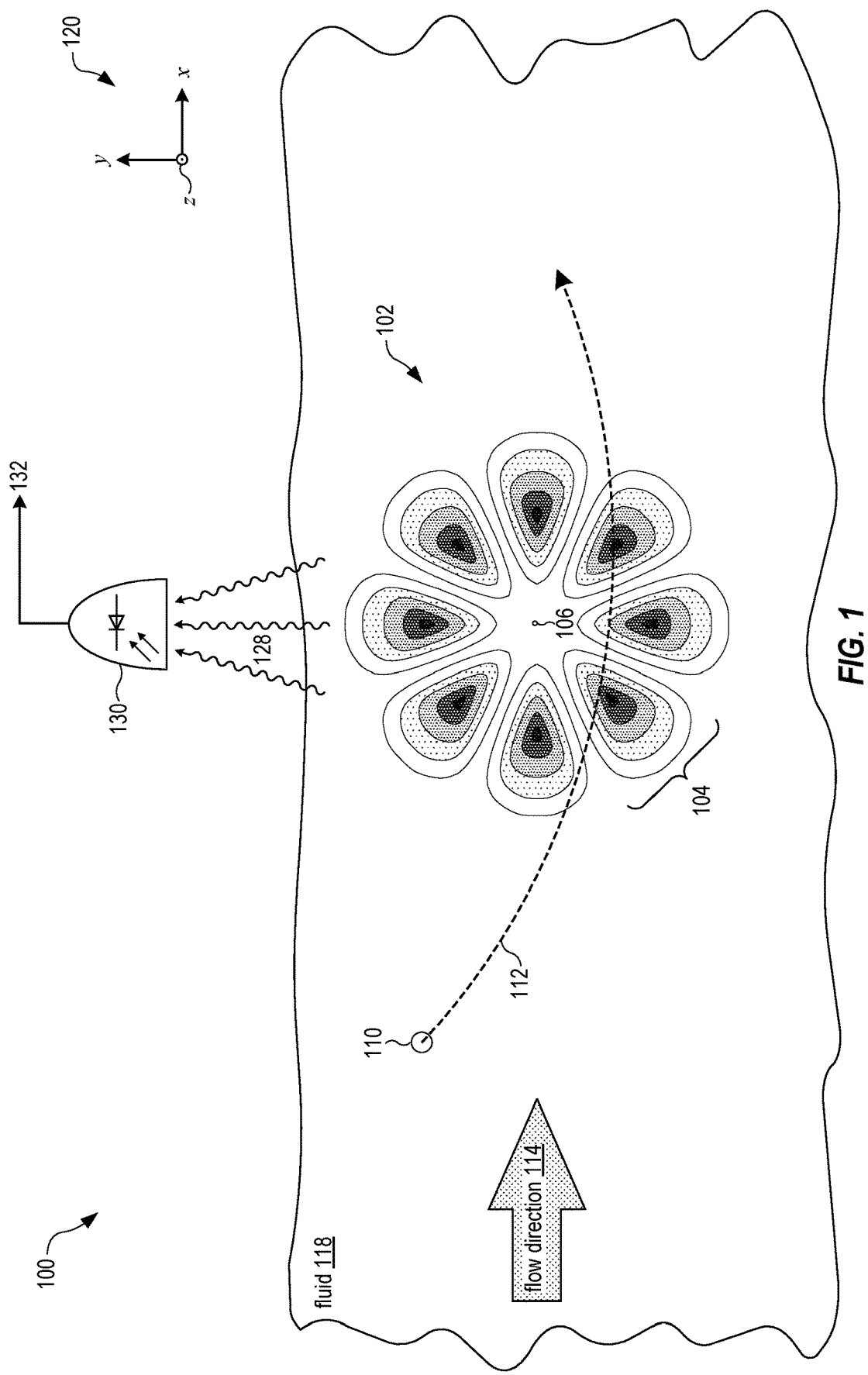
FIG. 1 is a schematic of a structured-light velocimeter measuring angular velocity of a tracer particle in a fluid, in embodiments.

FIG. 1 shows a structured-light velocimeter 100 measuring angular velocity of a tracer particle 110 in a fluid 118 as it passes through interference fringes 104 of a structured optical beam 102, also referred to herein as a probe beam 102. Optical beam 102 is structured in that it has a two-dimensional intensity profile with spatial variations that are more complex than that of a Gaussian or flat-top laser beam. Specifically, optical beam 102 may have an intensity profile with more than one local maxima, one or more local minima, or a combination thereof. Each of these local maxima and local minima may be a point or a curve (e.g., a ring). The two directions of the intensity profile lie in the plane perpendicular to an optical axis 106 along which optical beam 102 propagates. In FIG. 1, optical beam 102 is structured due to interference fringes 104, which are shown having rotational symmetry about optical axis 106. However, optical beam 102 may have interference fringes exhibiting another type of symmetry without departing from the scope hereof In other embodiments, optical beam 102 has structure that is not necessarily due to interference fringes. For example, the structure may be created with a spatial light modulator or mask that transforms a Gaussian or flat-top laser beam into structured optical beam 102.

Fluid 118 flows generally along a flow direction 114 and is seeded by tracer particle 110 such that tracer particle 110 follows the flow dynamics of fluid 118. Tracer particle 110 may be a sphere with an optically reflective coating that scatters (e.g., via specular reflection, diffuse reflection, photoluminescence, diffraction, etc.) structured optical beam 102 to generate scattered light 128. Some of scattered light 128 is collected onto a photodetector 130 that converts scattered light 128 into a time-varying electrical signal 132. For clarity in FIG. 1, only scattered light 128 received by photodetector 130 is shown. In addition, interference fringes 104 are shaded with contour lines that represent different intensities of structured optical beam 102, wherein darker shading corresponds to higher intensity. In other embodiments, photodetector 130 detects optical beam 102 (after tracer particle 110 has scattered light therefrom) instead of scattered light 128.

In FIG. 1, tracer particle 110 has a curved trajectory 112 in the x-y plane (see right-handed coordinate system 120) corresponding to a circular orbit. Thus, tracer particle 110 has an angular velocity $\Omega$ in the x-y plane. Optical axis 106 of structured optical beam 102 is parallel to the z direction, and therefore structured optical beam 102 illuminates fluid 118 perpendicularly to flow direction 114 and parallel to a rotational axis of tracer particle 110. When interference fringes 104 are radial interference fringes, the transverse intensity profile of structured optical beam 102 in the x-y plane has an n-fold rotational symmetry about optical axis 106, as opposed to the full rotational symmetry that is typically exhibited by an optical beam (e.g., a circular Gaussian beam or top-hat beam). Due to this symmetry, the amount of scattered light 128 from tracer particle 110 varies as it traverses structured optical beam 102.

Structured optical beam 102 can be any optical beam whose intensity profile varies sufficiently in the x-y plane and exhibits interference fringes 104. In the example of FIG. 1, the optical beam 102 is a superposition of two Laguerre-Gauss (LG) beams having opposite orbital angular momentum mode numbers ±l, where l=4. In this case, structured optical beam 102 has n=2l=8 angular fringes 104 and a total orbital angular momentum of zero. However, structured optical beam 102 may be generated as a superposition of any combination of LG beams. In embodiments, structured optical beam 102 is generated by a pair of interfering LG beams having different opposite values of l(e.g., l=±6 such that n=12, l=±10 such that n=20, etc). In embodiments, structured optical beam 102 is generated by interfering LG beams having non-opposite mode numbers (e.g., l=+4 and l=−3), wherein structured optical beam 102 has a total orbital angular momentum that is non-zero. Structured optical beam 102 may also be generated by interfering one LG beam with a plane wave, or more generally by any beams with known transverse modes (e.g., solutions to a Helmholtz equation) that interfere to yield interferences with a known structure. Structured optical beam 102 may alternatively be generated by locally modulating a Gaussian or top-hat beam (e.g., via a spatial light modulator or digital micromirror device) to have an intensity profile with angular lobes.

In general, structured optical beam 102 may have any transverse intensity profile that is structured, regardless of symmetry, provided that the resulting time-varying electrical signal 132 has a pattern that can be mapped back to the angular velocity ω of tracer particle 110. In some embodiments, structured optical beam 102 has linear or rectangular symmetry, as opposed to rotational symmetry about optical axis 106 (e.g., as shown in FIG. 1). In these embodiments, the structured optical beam may be a Hermite-Gaussian laser beam (typically characterized by a pair of transverse electromagnetic mode numbers) or another type of optical beam whose transverse profile exhibits linear or rectangular symmetry. In another embodiment, structured optical beam 102 is formed by interfering two plane waves at an angle.

Figure 2:
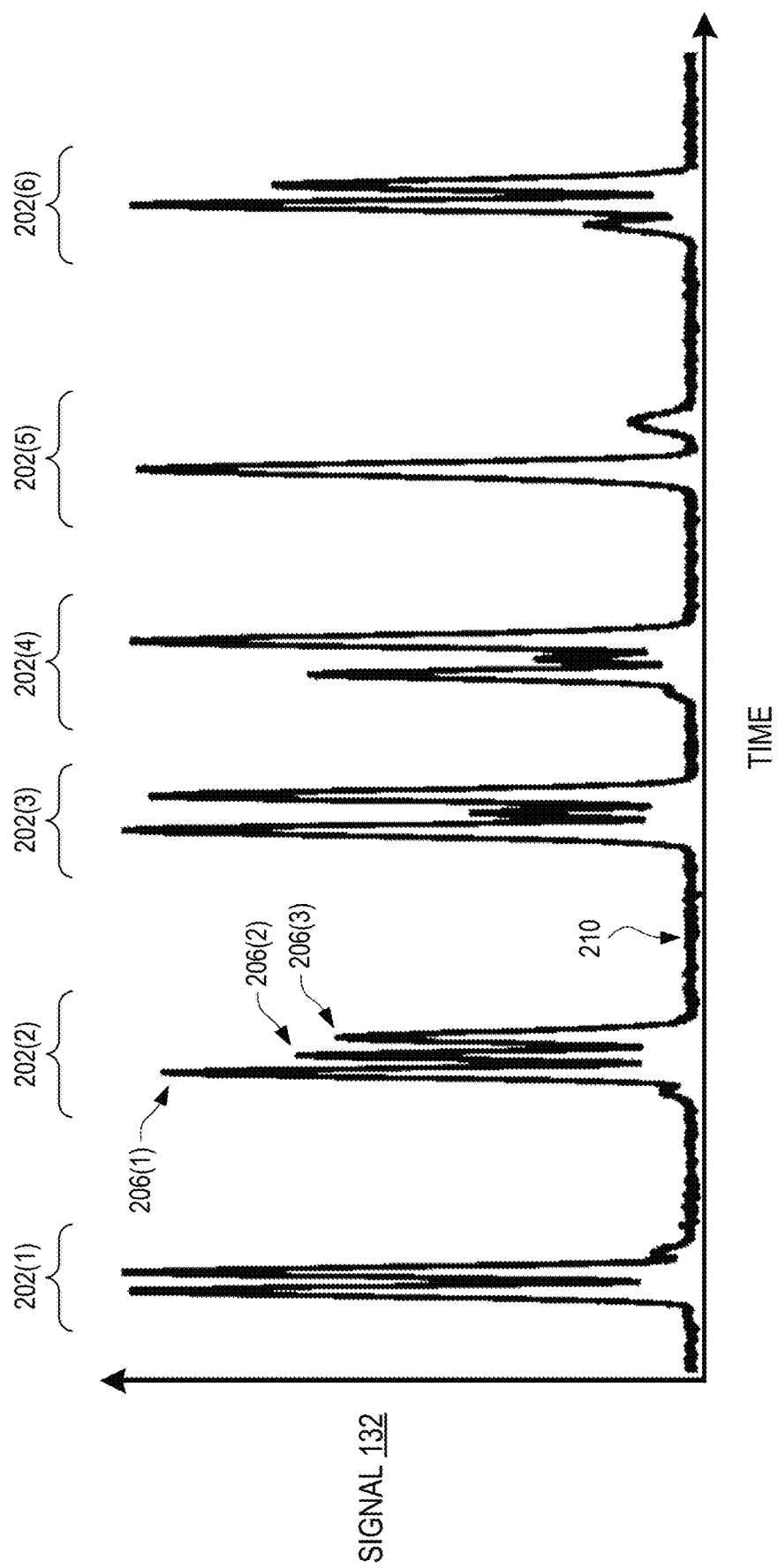
FIG. 2 is a plot of an example time-varying electrical signal generated by the structured-light velocimeter of FIG. 1 in response to detecting the tracer particle traversing a structured probe beam.

FIG. 2 is a plot of time-varying electrical signal 132 as a function of time for six tracer particles 110 that traverse structured optical beam 102 sequentially. Signal 132 includes a plurality of bursts 202, each of which are caused by a respective transit of one particle 110 through structured optical beam 102. Each tracer particle 110 gives rise to one burst 202 that includes one or more peaks 206. For example, a second burst 202(2) contains a first peak 206(1), a second peak 206(2), and a third peak 206(2). Adjacent bursts 202 are separated by a noise floor 210. It should be understood that the specific shape and spacings of bursts 202 illustrated in FIG. 2 are illustrative examples of such shape and spacings, and is not meant to convey a limitation on either electrical signal 132 or bursts 202.

Figure 3:
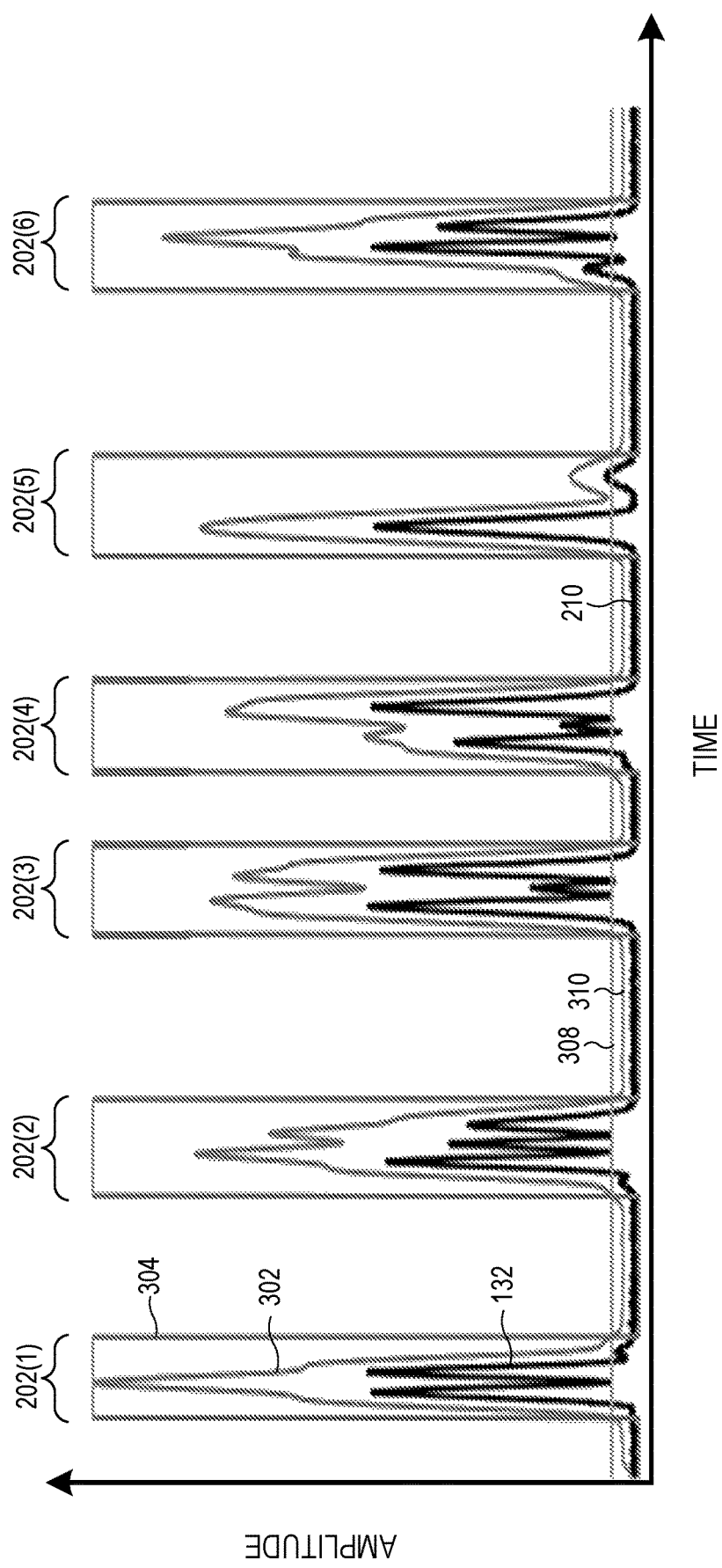
FIG. 3 is the plot of FIG. 2 with the added graphical depictions of methods used for extracting bursts from the time-varying electrical signal, in embodiments.

FIG. 3 is a plot of amplitude versus time for time-varying electrical signal 132, a cross-correlation signal 302, a multi-window function 304, and a threshold 308. FIG. 3 illustrates how bursts 202 can be identified from signal 132. Since signal 132 may drop to, or below, noise floor 210 within a burst 202 (e.g., see fifth burst 202(5)), a start time and an end time of a burst 202 cannot be identified solely based on a comparison between signal 132 and noise floor 210. Instead, cross-correlation signal 302 is generated by either convolving or cross-correlating signal 132 with a reference function that "smears" signal 132 such that cross-correlation signal 302 does not drop rapidly within each burst 202. The reference function may be a rectangular function, a triangular function, or any other type of mathematical function that "smears" signal 132 via cross-correlation. When the reference function has even symmetry, the cross-correlation of signal 132 with the reference function equals the convolution of signal 132 with the reference function.

The start and end times of each burst 202 can be identified where cross-correlation signal 302 rises above and drops below threshold 308. Note that threshold 308 is selected to be above a cross-correlation floor 310. Multi-window function 304 rises to 1 at each start time and falls to 0 at each end time, and therefore equals 1 for times when a burst 202 is present and 0 in between bursts 202. In some embodiments, a wavelet transform is instead used to find the start and end times of each burst 202.

Figure 4:
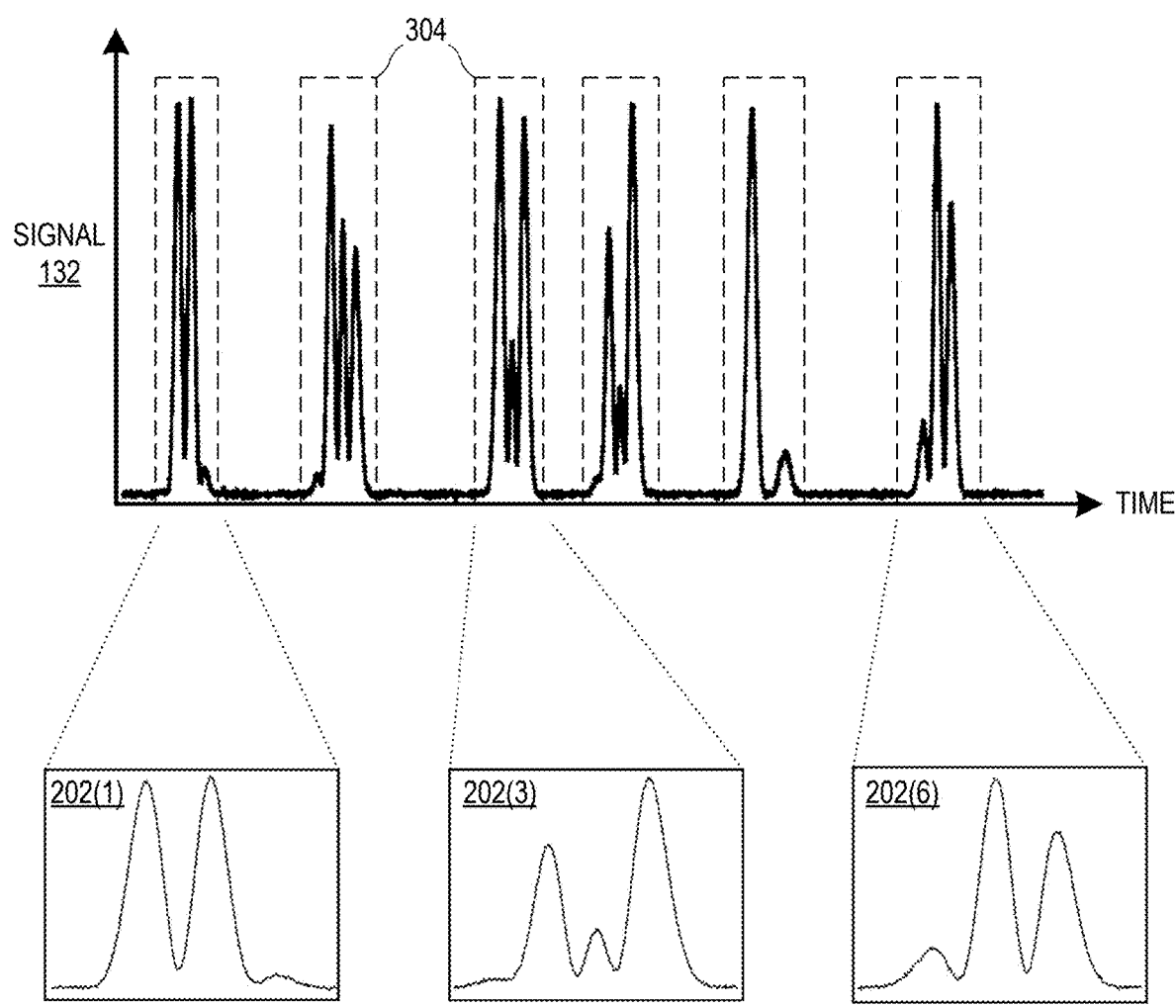
FIG. 4 illustrates use of a multi-window function for extracting bursts from the time-varying electrical signal, in embodiments.

FIG. 4 shows how multi-window function 304 may be used to extract bursts 202 from time-varying electrical signal 132 via cropping. For each burst 202, only the portion of signal 132 lying between the start and end times is extracted. For clarity, only bursts 202(1), 202(3), and 202(6) are shown as extracted. However, it should be understood that signal 132 may be cropped to extract each and every burst 202 therein.

Figure 5:
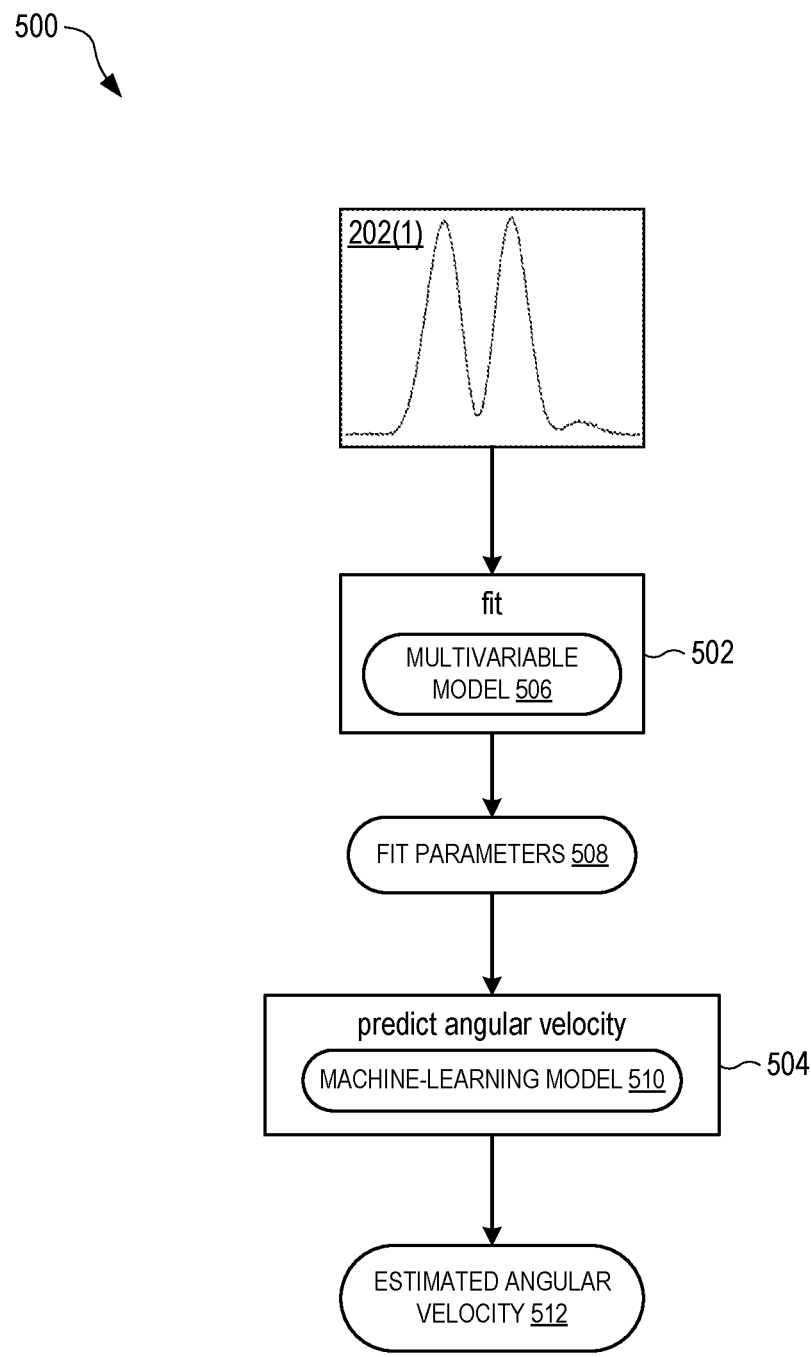
FIG. 5 illustrates a method for estimating angular velocity of the tracer particle of FIG. 1 based on extracted bursts, in embodiments.

FIG. 5 illustrates a method 500 for estimating the angular velocity of tracer particle 110 based on its burst 202. For clarity in FIG. 5, burst 202(1) is used as an example. However, it should be understood that method 500 may be repeated for each burst 202 to estimate the angular velocity of the corresponding tracer particle 110.

In block 502, burst 202(1) is fit to a multi-variable model 506. For example, burst 202(1) may be fit (e.g., using nonlinear regression) to a plurality of peaks, each parameterized by an amplitude, width, and center. The output of block 502 is a plurality of fit parameters 508. For example, when p peaks are identified within burst 202(1), then there are 3×p fit parameters 508. In addition, multi-variable model 506 may include a common additive offset, in which case block 502 outputs 3p+1 fit parameters 508. Each of the peaks may be fit to a Gaussian, Lorentzian, sech$^2$, or another type of pulse. Alternatively, a Fourier or wavelet decomposition may be used to obtain fit parameters 508.

In block 504, fit parameters 508 are inputted to a machine-learning (ML) model 510 to generate an estimated angular velocity 512. For example, machine-learning model 510 may be a multi-layer neural network with an input layer having a number of input nodes equal to the number of fit parameters 508, wherein each fit parameter 508 is inputted to one of the input nodes. The neural network may also have an output layer with only a single output node that outputs estimated angular velocity 512 as a numerical value. The neural network may be a deep neural network, a convolutional neural network, a recurrent neural network, or another type of artificial neural network. Alternatively, the machine-learning model may be implemented as a support-vector machine, a random forest, a Bayesian model, or another type of machine-learning model capable of regression analysis.

Figure 6:
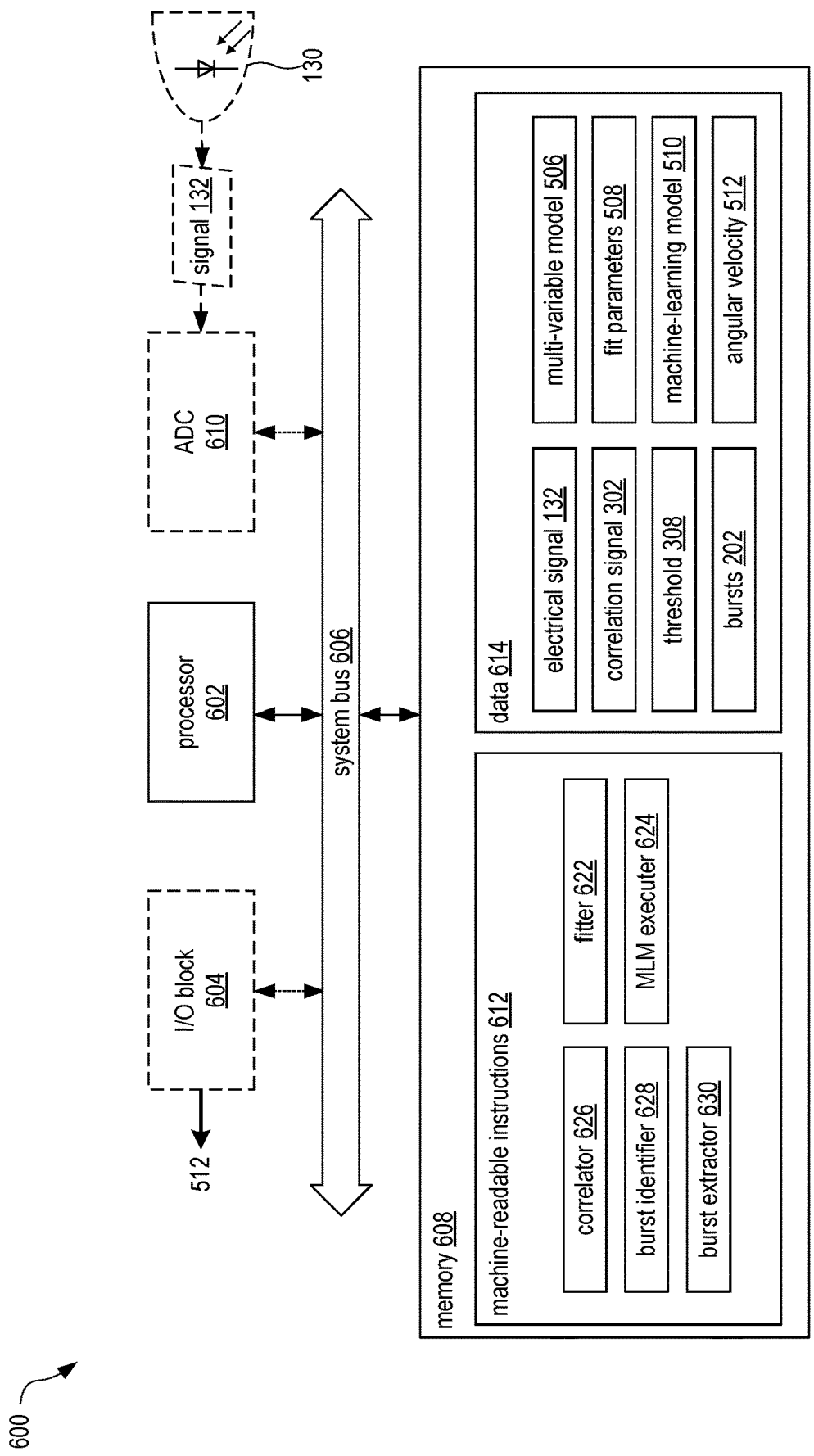
FIG. 6 is a schematic diagram of a structured-light velocimeter that implements the method of FIG. 5, in embodiments.

FIG. 6 is a schematic diagram of a structured-light velocimeter 600, in embodiments. Velocimeter 600 includes a processor 602, a memory 608 communicably coupled thereto, e.g., via a system bus 606 of velocimeter 600. Memory 608 may be volatile RAM located proximate to processor 602. Additional and/or other types of memory 608 may be used without departing from the scope hereof.

Velocimeter 600 may include at least one I/O block 604 that outputs estimated angular velocity 512 to a peripheral device (not shown). I/O block 604 is connected to system bus 606 and therefore can communicate with processor 602 and memory 608. In some embodiments, the peripheral device is a monitor or screen that displays angular velocity 512 in a human-readable format. Alternatively, I/O block 604 may implement a wired network interface (e.g., Ethernet, Infiniband, Fibre Channel, etc.), wireless network interface (e.g., WiFi, Bluetooth, BLE, etc.), cellular network interface (e.g., 4G, 5G, LTE), optical network interface (e.g., SONET, SDH, IrDA, etc.), multi-media card interface (e.g., SD card, Compact Flash, etc.), or another type of communication port through which velocimeter 600 can communicate with another device.

Processor 602 may be any type of circuit or integrated circuit capable of performing logic, control, and input/output operations. For example, processor 602 may include one or more of a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC). Processor 602 may also include a memory controller, bus controller, and other components that manage data flow between processor 602, memory 608, and I/O block 604.

Memory 608 stores machine-readable instructions 612 that, when executed by processor 602, control velocimeter 600 to implement the functionality and methods described herein. Memory 608 also stores data 614 used by processor 602 when executing machine-readable instructions 612. In the example of FIG. 6, data 614 includes, but is not limited to time-varying electrical signal 132, cross-correlation signal 302, threshold 308, bursts 202, multi-variable model 506, fit parameters 508, machine-learning model 510, and estimated angular velocity 512. In addition, some or all of data 614 may be stored in a secondary storage device (not shown), such as a hard drive, and fetched from the secondary storage device when needed.

In the example of FIG. 6, machine-readable instructions 612 include, but are not limited to, a correlator 626 that generates cross-correlation signal 302 from time-varying electrical signal 132, a burst identifier 628 that identifies bursts 202 based on where cross-correlation signal 302 crosses threshold 308, a burst extractor 630 that extracts each burst 202 from electrical signal 132 (e.g., see FIG. 4), a fitter 622 that fits each burst 202 to multi-variable model 506 to obtain fit parameters 508, and a machine-learningmodel (MLM) executor 624 that runs machine-learning model 510 with fit parameters 508 to generate the predicted angular velocity 512.

In some embodiments, velocimeter 600 includes an analog-to-digital converter (ADC) 610 that can communicate with processor 602 and memory 608 via system bus 606. ADC 610 may digitize time-varying electrical signal 132 so that velocimeter 600 can process it digitally. In embodiments, velocimeter 600 includes photodetector 130 communicatively coupled to ADC 610. Such embodiments of velocimeter 600 are examples of velocimeter 100.

Interference fringes 104 may be generated by superimposing two coherent beams of light to generate probe beam 102. Particles traveling through these fringes scatter light proportionally to the local intensity.

Figure 7:
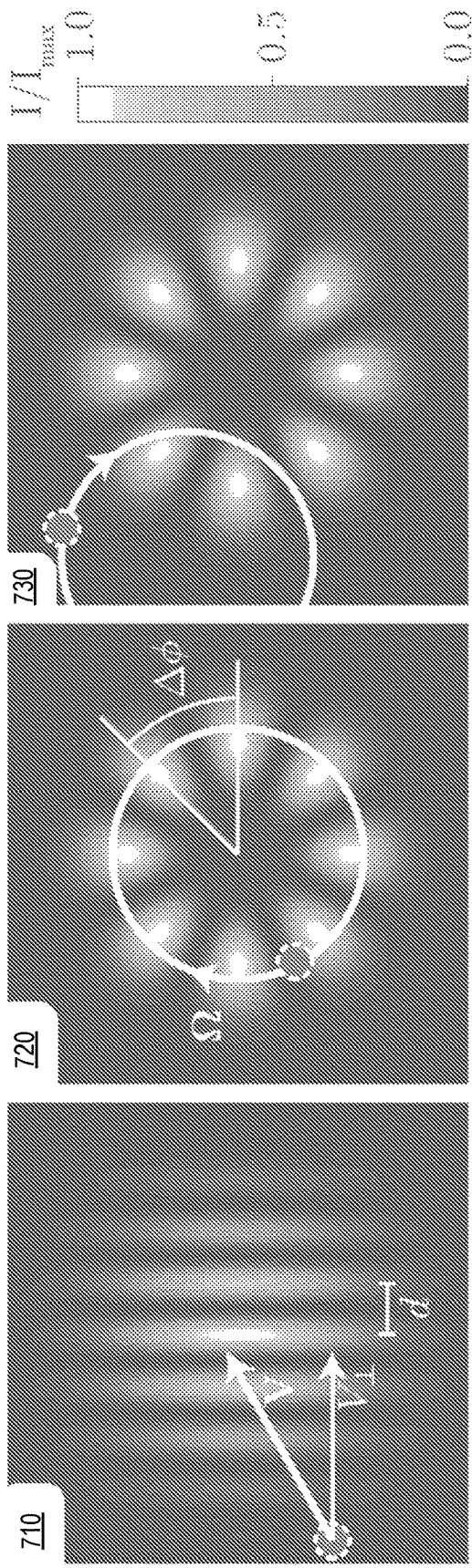
FIG. 7 depicts interference-fringe plots of structured probe beams and respective time-varying electrical signals generated by particles traversing the probe beams.
Figure 7:
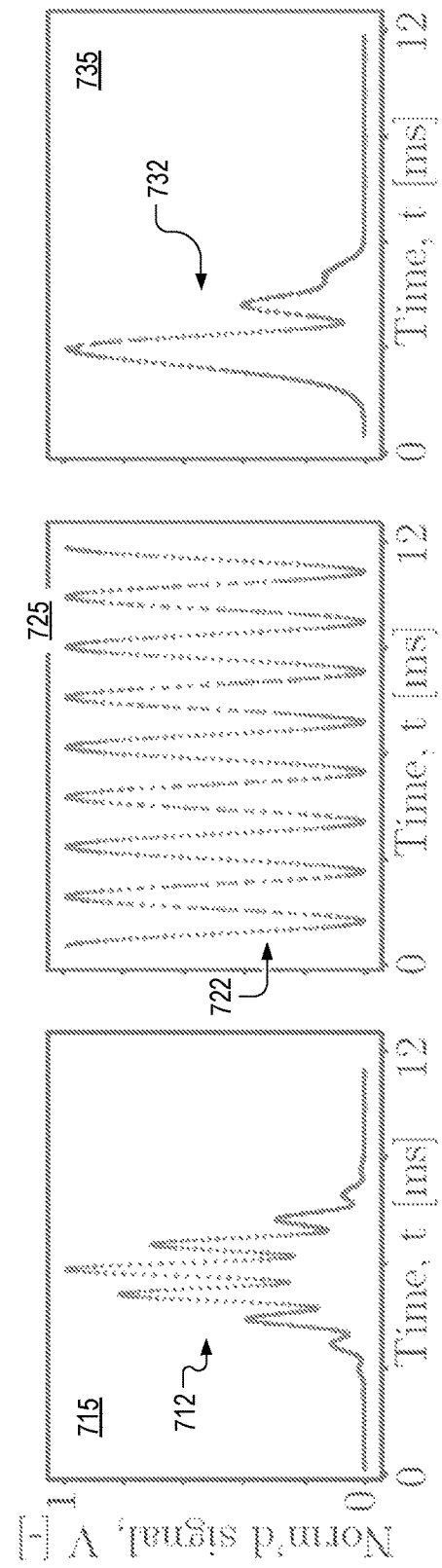

FIG. 7 depicts interference-fringe plots 710, 720, and 730, and respective scatter plots 715, 725, and 735. In one configuration, interfering plane waves give rise to sinusoidal fringes. As depicted in plots 710 and 715, the distance between fringes multiplied by the frequency at which the scattered light is modulated yields the component of the velocity orthogonal to the fringes.

The light scattered by a particle (e.g., tracer particle 110 of FIG. 1) traveling through interference fringes (e.g., interference fringes 104 of FIG. 1) is encoded with information regarding the particle's kinematics. Plots 710, 720, and 730 illustrate simulated schematics of scattering particles (dashed-outlined dots, radii r) traveling on trajectories (indicated with the bold white line) that pass through spatially varying intensity fields created by a) interfering two plane waves with a relative angle of 5.73° (plot 710) or interfering conjugate Laguerre Gauss beams with l=±4 and p=0 modes (plots 720, 730). Plots 715, 725, and 735 show resulting respective normalized scattered-light signals 712, 722, and 732 as a function of time. Each of scattered-light signals 712, 722, and 732 is an example of time-varying electrical signal 132.

In plots 710 and 715, the fringe spacing d divided by the period of the normalized signal V yields the component of the velocity vector of the particle in the direction perpendicular to the interference fringes, $V_\perp$. In plots 720 and 725, the fringe spacing $\Delta\phi$ divided by the period of the normalized signal V yields angular velocity $\Omega$. In plots 730 and 735, when the particle orbit and the light are not concentric, interpreting the resulting normalized signal is not straightforward and requires an alternative approach.

Modifications to the structure of the probe beam can yield alternative interference patterns that can be used to sense different properties of the flow. For example, the fan-like fringes created by interfering light with cylindrical wavefronts can be used to infer velocity gradients close to a wall. Likewise, radial interference fringes can be used to measure angular velocities. As shown in plot 720 and plot 725, the angular velocity $\Omega$ of a particle traveling on a circular trajectory concentric with radial interference fringes can be determined from the product of the radial fringe spacing and the intensity modulation frequency, $\Omega=\Delta\phi \times f_{mod}$. In most fluid flows, however, particle orbits are not concentric with the probe beams, and orbit radii may be larger than the size of probe beam 102. What results is a signal processing challenge: no one-to-one relationship between the angular velocity and the expected signal necessarily exists (compare the signals in plot 725 and plot 735 that correspond to the same angular velocity). These more complex scenarios therefore require an alternative strategy for signal analysis. Embodiments of velocimeters disclosed herein accommodate complicated signals with a machine-learning-based signal processing scheme. Velocimeters described hereinafter are examples of velocimeter 600.

Previous direct attempts to measure rotation in fluids fall into two classes: scattering of unpatterned light by specially engineered particles, and scattering of patterned or structured light by the same particles used for particle image velocimetry (PIV) and laser Doppler velocimetry (LDV). In the first class, the vorticity (a measure of the local angular velocity) of small spherical particles with embedded planar mirrors are measured with a spatial grating system. The spatial and temporal resolutions of this strategy are small (μm) and fast (ms). However, the environments in which measurements of this type can be conducted are limited, as matching the optical and physical properties of the seeding particles to those of the flow is required but can only be accomplished in specific cases. Moreover, fabricating the seeding particles is quite involved.

In the class of direct rotation sensors that illuminate readily available small particles with structured light, one approach calculates the fluid circulation by statistically analyzing the frequency shifts present in the scattered light when particles traverse a ring-shaped Laguerre-Gauss (LG) beam. LG beams have phases that vary azimuthally as $\exp(il\phi)$, where $i=\sqrt{-1}$, l is the azimuthal mode number, and $\phi$ is the azimuthal angle about the beam axis. LG beams also have radial modes indexed with p; here, all LG beams have p=0. These beams possess lh of orbital angular momentum. Because changes in phase give rise to changes in frequency, particles passing through such beams scatter frequency-shifted light. The system of Ref. [1] was demonstrated using a flow field simulated on a digital micromirror device, and was found to estimate the vorticity with a spatial resolution of 0.1 cm. However, the statistical signal processing technique requires many particle transits through the probe beam, and this limits the temporal resolution of the velocimeter. In the simulations of Ref. [1], for example, the transits of 250 particles were assembled for each measurement. The experiments of Ref. [1] were conducted in a highly controlled environment that allowed for frequency shifts to be measured via optical heterodyne, interfering the scattered light with a reference beam on the photodetector. In such a configuration, the probe and reference beam travel separately to the photodetector, with the probe beam traveling through the fluid and the reference beam bypassing the fluid. Consequently, the beams experience different environments could induce phase noise and beam steering, complicating detection in actual fluid applications.

An alternative approach for characterizing fluid rotation by measuring vorticity also uses LG beams to probe a seeded flow, but bypasses the challenges associated with the detection scheme of Ref [1] by combining the signal and the reference beams before they enter the flow. As such, optical modes remain overlapped and maintain their mutual coherence, even if features of the environment distort the wavefronts. The resulting beam has a petal-shaped interference pattern with 2l lobes. This technique relates the frequencies of the intensity modulated scattered light to the angular spacing of the petal fringes to determine the angular velocities of the particles. The working principle of this velocimeter is illustrated in plot 720 and plot 725. However, two assumptions limit the applicability of this technique to more general flows. The first limiting assumption is that the particle orbits are concentric with the beam axis. This restricts where in the flow a conventional velocimeter can function and makes the velocimeter sensitive to misalignment between the beam and rotating structures in the flow. The second limiting assumption is that the fluid moves obeying solid body rotation. A conventional velocimeter always predicts the vorticity of the flow to be twice the angular velocity, even if the vorticity has contributions due to shear, meaning the flow behavior does not consist fully of the solid body rotation mode.

Velocimeters disclosed herein build on the above approach, adding a more complex signal processing scheme to remove the limitations on which flow configurations it can be used with. As before, this is an Eulerian sensor, meaning that it remains fixed in the lab frame and it monitors the flow as it passes by. In an example approach, we measure the angular velocity instead of the vorticity because in general cases, the Biot-Savart Law indicates that the velocities in a flow are due in part to contributions from both local and nonlocal vorticities.

We measure the angular velocity of a single particle embedded in a two-dimensional flow (i.e., no velocity components in the direction of the probe beam) as it travels on a curved pathline and passes through a probe beam. Specifically, we model the pathline of each particle as a circular arc, and we predict the particle's steady-state angular velocity $\Omega$ along that arc. Approximating particle trajectories as curved can be justified by noting that many other flow velocimetry techniques assume particles travel only in straight lines. As in LDV, we sense this motion using a probe beam with interference fringes whose geometries are well characterized, and are formed by conjugate LG beams having azimuthal modes ±1. Also like these velocimeters, we make no assumptions about the viscosity of the fluid. As we will explain below, while both LDV and Ref. [2] use frequency-domain signal processing strategies, such an approach is not appropriate for the expected signals from this technique. The signal processing strategy that accompanies embodiments of the angular velocity sensor requires characterizing each burst in the return signal resulting from the light scattered as a particle transits the probe beam and extracting a set of metrics with which we predict $\Omega$. These predictions are conducted with a supervised machine-learning regression model that is trained using experimentally validated simulated data. We expect that this velocimeter will function at short time scales defined by the duration of the particle transit as well as at short length scales set by the relative sizes of the particle and the transverse intensity profile of the probe beam. We anticipate that this velocimeter will find applications in systems that can accommodate only one optical access port, where imaging techniques might not be possible, and where pathlines through probe beams cannot be approximated as linear.

Remaining sections of the specification include sections 2-7. A mathematical model used to simulate expected experimental signals is presented in Sec. 2. Experimental validation of these simulated signals is described in Sec. 3. With the simulated signals experimentally validated, we consider signals collected via simulations and experiments as interchangeable, and therefore are able to more flexibly and efficiently formulate and evaluate a signal processing strategy associated with the velocimeter using simulated results. The signal processing technique is discussed in Sec. 4. First, we describe the signal conditioning steps of the technique in Sec. 4.1. Then, in Sec. 4.2, we present the machine-learning regression model of the velocimeter that predicts the angular velocity and orbit radius of particles. The results are discussed in Sec. 5. Velocimeter limitations are outlined in Sec. 6, where we pay special attention to the parameters that set the resolution of the velocimeter. Finally, we close with a discussion in Sec. 7, where we explain strategies extending the capabilities of the velocimeter to more complex fluid flows.

2. Velocimeter Overview and Simulations

Figure 8:
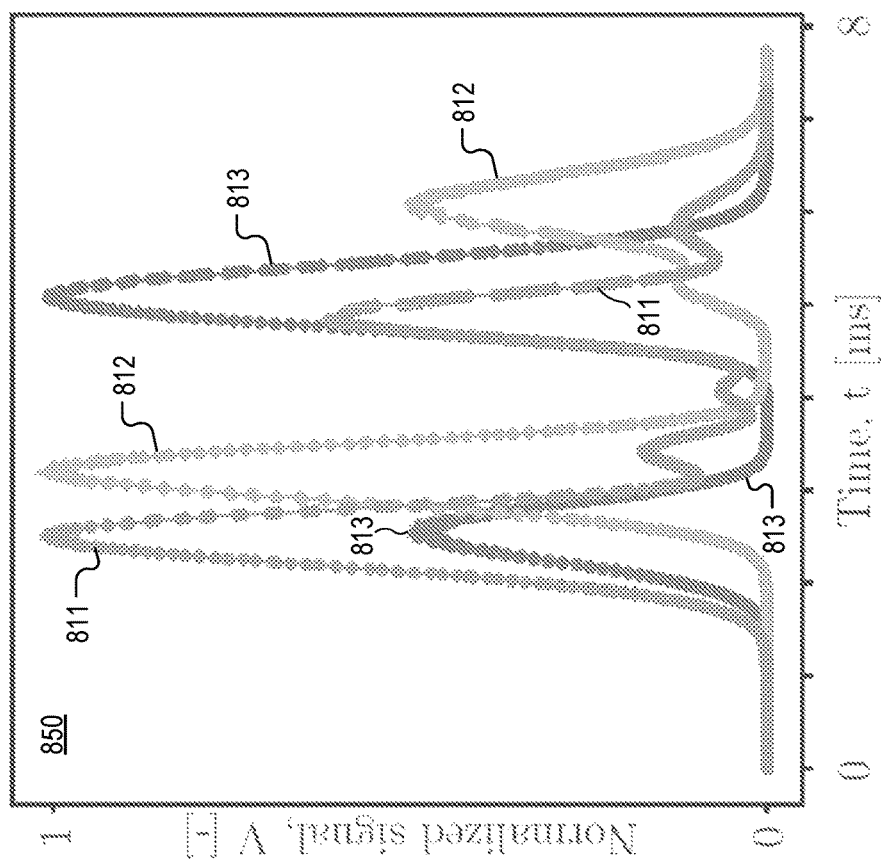
FIG. 8 illustrates the sensitivity of the structured-light velocimeter to spatial offsets of a circular particle trajectory within a structured probe beam, in embodiments.
Figure 8:
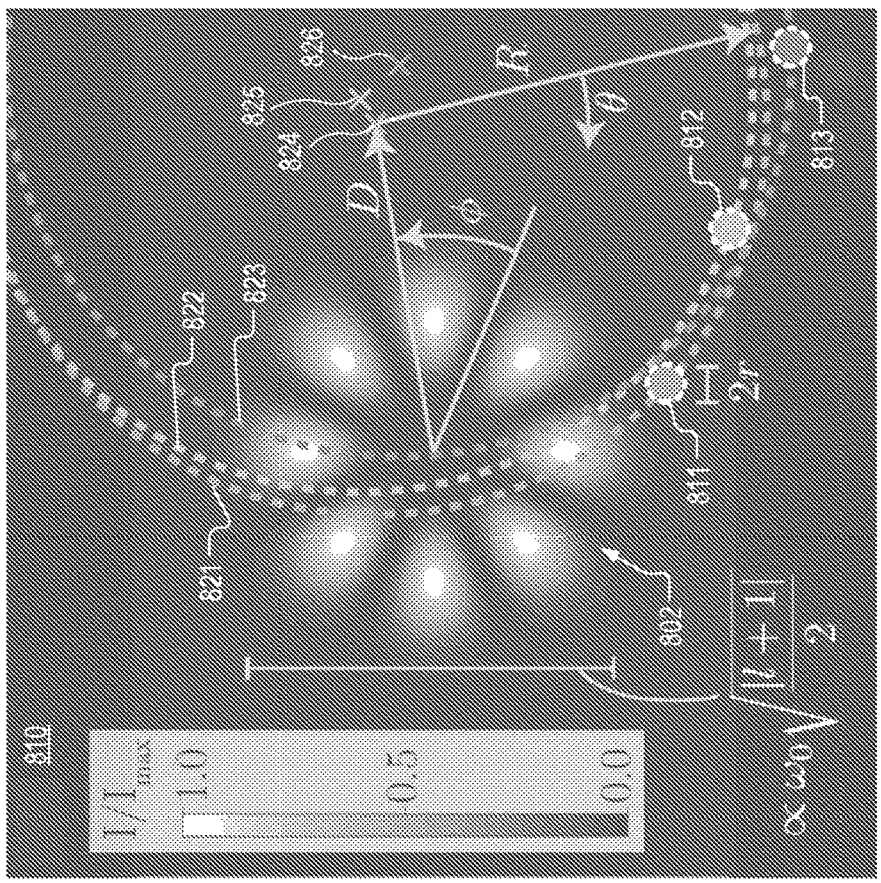

When the probe beam and the particle axis of rotation are misaligned, as depicted in plot 730, the particle no longer traverses interference fringes spaced equally in angle, and the resulting time series no longer possesses a single temporal frequency that can be used in such an analysis. In fact, as shown in FIG. 8, particles can travel on orbits with the same radius and at the same angular velocity but yield very different time series when these orbits are centered at even slightly different locations. Thus, a more sophisticated signal processing scheme is required to predict the angular velocity $\Omega$ of the particle under the many possible combinations of orbit radii, centers of rotation, and angular velocities.

FIG. 8 includes a schematic 810 depicting a particle of radius r traveling on an arc of radius R (broken lines) at an angular velocity $\Omega=d\theta/dt$. This orbit is centered at position (D, $\phi$)(orbit centers marked with crosses) relative to the center of an interference pattern 802, which is an example cross-section of optical beam 102. As the particle passes through the interference pattern, it scatters light proportional to the intensity of light within the area of the particle. The size of the interference pattern is set by the beam waist, $w_0$, and the azimuthal index of the light, l. Schematic 810 illustrates orbits of three particles 811, 812, and 813, each traveling on a respective orbit 821, 822, and 823 at the same angular velocity $\Omega$, but the positions (D, $\phi$) of these trajectories are slightly different. The orbits 821, 822, and 823 are arcs with the same radius R, and have respective centers 824, 825, and 826.

FIG. 8 also includes a plot 850 that shows simulated time series for the particles shown in schematic 810, each normalized by its maximum value. Although the particles can all be considered to obey the same physics, the resulting signals are dissimilar due to where they cross the interference pattern. This illustrates the fundamental problem that the present embodiments address, i.e., that particles which travel according to the same physics, but which are probed at slightly different positions yield time series, may not resemble each other. Parameters for particles 811, 812, and 813): $w_0$=93.84 pixels, l=±4, r=20 pixels, R=400 pixels, D=[340.3, 367.7, 396.6] pixels, respectively, $\phi$=[−0.178, −0.205, −0.88] rad, respectively, and $\Omega$=250 rad/sec.

To train and validate embodiments of machine-learning model 510 for predicting the angular velocity and orbit radius of scattering particles traversing a probe beam 102, we numerically simulate the expected backscattered light that forms our data. In these simulations, we artificially sample an intensity petal pattern formed by interfering two LG beams with azimuthal modes l=±4, radial modes p=0, and a beam waist w(z) with a minimum of $w_0$(z)=93.84 pixels on a 986×616 pixel grid. These values were set to match the experiment that we use to validate the simulated signals, which is discussed in Sec. 3. Positions on the grid are referenced to its center using a radial coordinate system, ($\mathcal{R}$, $\phi$).

The expected signal is modeled to be proportional to the scattered light from a particle. For simplicity, we model the scattering particle as a mirror oriented towards the detector, assuming that the particles have the same size, shape, and reflectivity so that the intensity of the light incident on the detector depends only on the intensity field at the particle location. Such assumptions are valid when the ratio of the spatial extent of the intensity pattern to the distance between the detector and the particle is small. Further, the simulated particles have identical radii of r=20 pixels. Homogeneous seeding particles are readily available for fluid sensors due to advances in particle fabrication techniques. In what follows, the size of the particle and the ratio $r/w_0$ remains unchanged and therefore is not necessarily optimized.

The simulated time series includes signals from many particles passing through the petaled beam in series, with no more than one particle traversing the beam at a time. These passes are spaced in time to reflect a low density of seeding particles such that the time between transits is at least as long as half the average time of a transit. As we will see in the signal conditioning step described in Sec. 4.1, spacing of approximately this time or longer is necessary for identifying the salient features of the signals.

The relevant particle transit parameters to this problem are illustrated in schematic 810, FIG. 8. We model the motion of each particle to have a constant angular velocity along a circular trajectory. The backscatter signal that results from a particle traversing the interference pattern is $$\underbrace{V(t)}_{signal} \propto \left[\underbrace{g(\mathcal{R}, \phi)}_{particle} * \underbrace{I(\mathcal{R}, \phi)}_{intensity}\right] \times \underbrace{X(\mathcal{R}, \phi, t)}_{trajectory} + \underbrace{n(t)}_{noise},$$

where the particle is considered to be a perfect mirror using a top-hat function g ($\mathcal{R}, \phi$) equal to 1 within radius r and 0 otherwise. The particle functions as the kernel of a round blurring function that operates on the calculated intensity field of the interference pattern, I($\mathcal{R}, \phi$). The particle trajectory X ($\mathcal{R}, \phi$, t) is centered at (D, $\phi$) relative to the beam center. The blurred intensity is sampled as a function of time t along the trajectory of the particle at a sample rate of 100 kHz. We add white noise to the time series to generate the expected detector signal V.

The parameter space includes seven variables, $\{w_0, l, r, R, \phi, D, \Omega\}$, and is illustrated in schematic 810. We reduce the dimensionality of the parameter space by fixing the characteristics of the light ($w_0$, l) as well as the particle radius (r). Additionally, we leverage the radial symmetry of the light to restrict $\phi$, limiting the orbit center positions relative to the beam axis to angles $\pi/(2l) \leq \phi < 3\pi/(2l)$. At each (D, $\phi$), where D is the distance between the orbit center and the beam axis, the orbit radius R is limited to values that allow the particle to pass through the petals of the interference fringes. Noting that the beam width at full width half maximum intensity scales by $$r_p \sim w_0 \left(\frac{|l+1|}{2}\right)^{1/2},$$

this limitation constrains R to $D-r_p-r<R<D+r_p+r$. Any particle radius r on an orbit with radius R centered at (D, $\phi$) relative to the beam axis, then, will travel through the interference fringes.

Plot 850 illustrates simulated signals corresponding to particles 811-813 traveling on orbits with the same radii at the same angular velocities, but with slightly offset orbit centers. Though the particles in each of these simulations move according to the same physics, the resulting time series appear to have no similarities. These traces emphasize the signal processing challenge of this velocimeter, which is to create a model that relates a set of metrics from these dissimilar signals to predict the same angular velocity $\Omega$.

In this section, we have presented a velocimeter in its fringe configuration, but we note that the velocimeter also may be operated in a heterodyne configuration, wherein the flow is illuminated with only one beam (no interference fringes). In this alternative setup, particles in the flow backscatter Doppler-shifted light that interferes with a second (local oscillator) beam on the detector, and the velocity of the particles is related to the measured frequency shift. Likewise, the rotation measurements disclosed herein may also operate in this alternative heterodyne configuration in which the flow would be illuminated with a single LG beam and then the backscattered light would interfere with a conjugate LG (local oscillator) beam on the detector. While the fringe and heterodyne optical arrangements are mostly equivalent, the fringe method disclosed herein provides an increased tolerance to scattering, as phase aberrations do not affect the overlap of the beams. The fringe method also eases the alignment constraints in the detection system.

Because simulations provide a more controllable environment than experiments, we use the simulations detailed in this section to develop and evaluate the velocimeter. We proceed by first ensuring that the simulations capture the important experimental features by comparing them to experimental results. This validation process is described in the following section.

3. Experimentally Validating the Backscattered Light Simulations

To experimentally validate our simulations, we conduct highly controlled experiments and compare the results to our simulations with a cross correlation. While the velocimeter may be used in fluid flows, the proof-of-concept experiments we present here replaces the fluid system with a digital micromirror device. This gives us precise control of the dynamics of the 'flow' and allows consistent repetition of a particular condition. Ultimately, this allows us to verify that, up to the assumptions outlined in Sec. 2, our simulations match our experiments. In the first subsection below, we present our experiment and discuss the experimental data acquisition process. In the second subsection, we describe the experimental validation strategy that we use to justify replacing experiments with simulations in developing the velocimeter.

3.1 Experimental Setup

Figure 9:
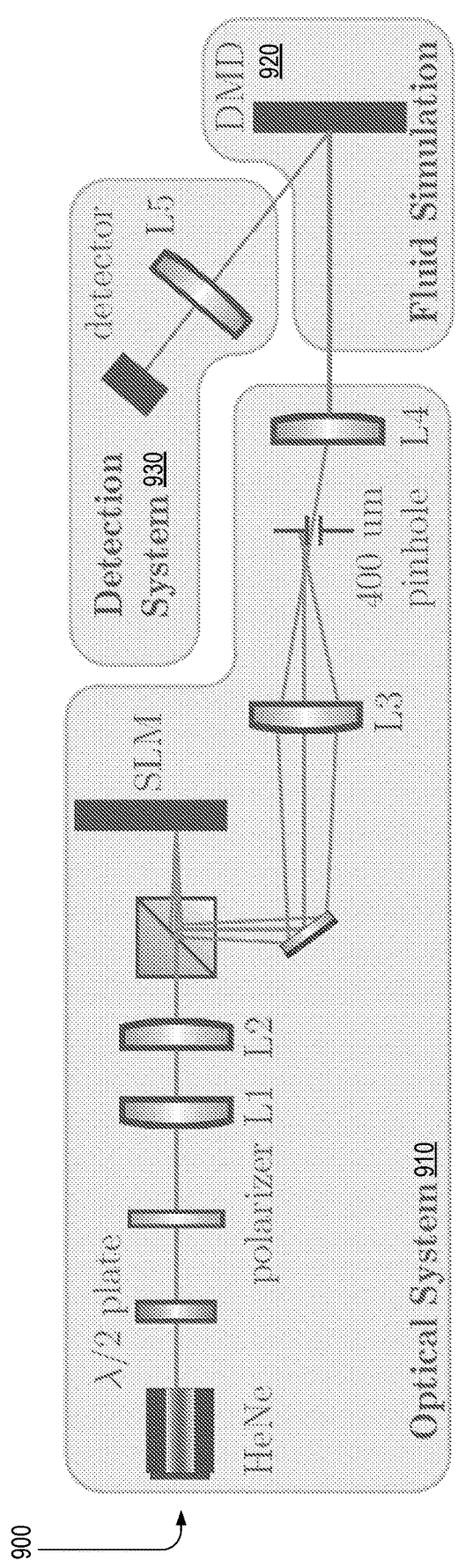
FIG. 9 includes a schematic of an apparatus for validating the velocimetry simulations, in embodiments.
Figure 9:
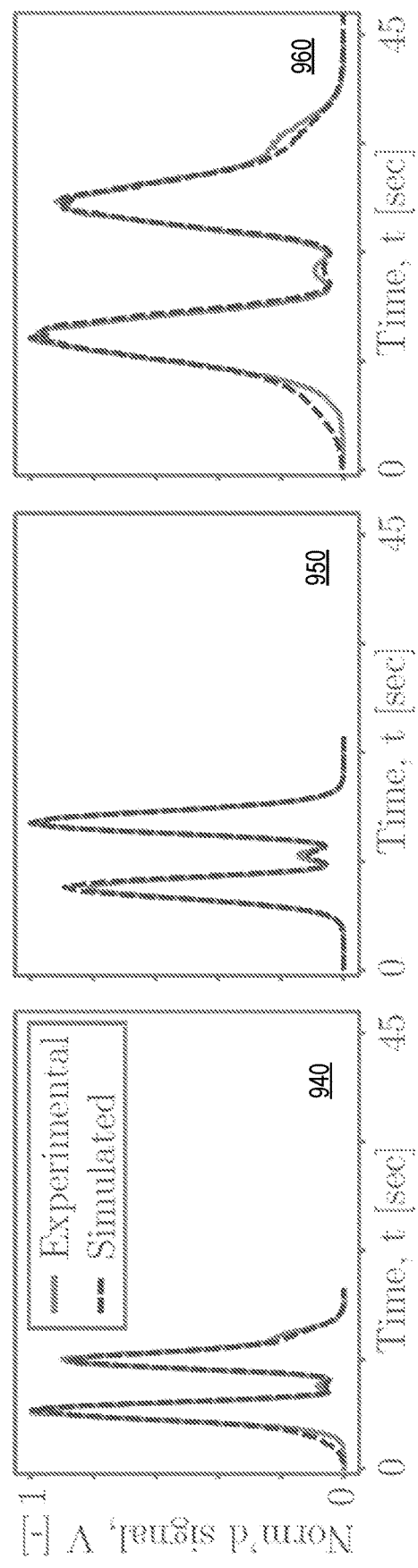

FIG. 9 includes a schematic of an apparatus 900 for validating the velocimetry simulations disclosed herein. Apparatus 900 includes an optical system 910, a digital micromirror device (DMD) 920, and a detection system 930. Optical system 910 includes a half wave plate, a polarizer, lenses L1-L4, a pinhole, and a spatial light modulator SLM. Detection system 930 includes a lens L5 and a detector.

Using a HeNe laser (Thorlabs, HNL050LB) as a light source, we prepared a Laguerre-Gauss beam of light with l=±4 using a spatial light modulator (SLM, Cambridge Correlators, SDE 1024). The SLM was programmed to display a computer-generated hologram consisting of a forked grating and a mask that selects only the $LG^{p=0}$ radial orders in each of the diffracted beams. The first diffracted order was then isolated from the others with a spatial filter and directed toward DMD 920 (e.g., Texas Instruments, DLP4500). DMD 920 displayed a video of a small circle (radius 0.15 mm) traveling on a circular trajectory. These videos were designed so that no more than one particle passed through the light at a time. The video framerate was fixed at $f_{dmd}$=0.225 Hz. The light sampled by this moving group of mirrors was collected on a photodetector (Thorlabs, Det36a), which is an example of photodetector 130. The resulting time series was low-pass filtered (Mini-Circuits BLP-1.9+, 1.9 MHz cutoff frequency lumped LC low-pass filter) and then digitized with a data acquisition system (DAQ, National Instruments, USB6215) with a sampling rate of $f_s$=100 kHz. Though the cutoff frequency of the low pass filter was greater than half the sampling rate of the DAQ, meaning that aliasing could have occurred, the dynamics of the experiment (0.225 Hz) were far slower than either the cutoff frequency (1.9 MHz) or the sampling rate (100 kHz), so this was not a concern and any data that was aliased was interpreted as noise.

Optical system 910 prepares the probe beam to be directed to the fluid simulation module by converting the Gaussian laser beam from the HeNe laser to a superposition of conjugate ±l=4 Laguerre Gaussian beams. The fluid simulation is conducted on DMD 920. Simulated scatterers reflect light to detection system 930, which digitizes the intensity of the light impinging on a detector, yielding examples of signal 132.

FIG. 9 also includes plots 940, 950, and 960, each of which include experimental (solid lines) and simulated (broken lines) normalized signals as a function of time. Parameters for simulations and experiments shown in 940-960 are: $w_0$=93.84 pixels, l=±4, r=20 pixels, R=1200 pixels, D=[1250, 1265, 1250] pixels, respectively, $\phi$=0 rad, and $\Omega$=[654, 548, 223] rad/sec, respectively. Each normalized signal of plots 940, 950, and 960 are examples of burst 202.

In principle, we could have run our experiments at a rate set by the ultimate speed of the DMD 920, 4225 Hz. However, because the objective of these experiments was to generate data with which to validate our simulations, we opted to operate at a fraction of this speed so that we could average the signal at each frame to improve its signal-to-noise ratio (SNR). Each video frame played for $f_{dmd}^{-1}$=4.44 seconds, and the voltage corresponding to the intensity of the light impinging on the photodetector for that frame was calculated using the signal from the middle 4 seconds of data. Prior to averaging, we applied a numerical Butterworth filter (5th order, cutoff frequency 50 Hz) to the signal for smoothing. These steps increased the SNR by reducing the effects of noise arising from the influence of the multimodal nature of the laser as well as the noise induced by circuitry implemented to support the DAQ. The SNR, calculated as the ratio of the mean and the standard deviation of the numerically smoothed signals, was found to be, on average, 42.

We designed the DMD videos so that the averaged signal would correspond to the motion of a particle traveling on an arc with a specific angular velocity, sampled at $f_s$. The particle position was calculated such that it moved along its arc by an angular spacing $\Delta\phi = f_s/\Omega$. Because $f_s$ was fixed, we varied the angular velocity of the experiments by changing the angular spacing between the frames.

3.2 Comparing Signals from Simulations and Experiments

We conducted 47 experiments to validate our simulations varying D and $\Omega$ (1150≤D [pixels, 10 values]≤1305, and 223≤$\Omega$ [rad/sec, 7 values]≤655) while fixing the remaining parameters at the following values: $w_0$=93.85 pixels, l=±4, r=20 pixels, R=1200 pixels, $\phi$=0.0±0.01 rad. Examples of the experimental results compared to their simulated counterparts are shown in plots 940-960, FIG. 9. To assess the similarity of the experimental and simulated signals, we calculated the maximum cross correlation, normalizing it by the autocorrelation of each of the signals at zero lag:

$$\max(\hat{R}_{xy}) = \max\left((R_{xx}R_{yy})^{-\frac{1}{2}} R_{xy}\right),$$

where equation (3.1) is an expression for $R_{xy}(m)$.

$$R_{xy}(m) = \begin{cases} \sum_{n=0}^{N-m-1} x_{n+m} y_n^*, & m \geq 0 \\ R_{yx}^*(-m), & m < 0 \end{cases} \quad (3.1)$$

In equation (3.1), $-\infty < n < \infty$, m>0, N is the length of the longer signal x or y, and the superscript asterisk of $y_n^*$ and $R_{yx}^*$ denotes the complex conjugate. We find high correlations between the simulated and experimentally collected signals, with the mean and the standard deviations of the correlations of each of the 47 experiments with its corresponding simulation being 0.96 and 0.03, respectively.

As discussed above, our simulations were constructed with a discretization selected to match the pixilation of DMD 920, with pixels in both cases being square having widths s=7.637 μm. Projecting the radial pattern on the square grid created the possibility that the pixel orientations were rotated relative to each other, and this could have an influence on the calculated and measured intensities. However, because the particle is large relative to the pixels (r/s=20) and blurs the intensities from every pixel within it, we found this effect to be negligible. As seen in plots 940 and 960, the agreement between the simulation and the experiment appears to break down when the particle starts and finishes its transit through the probe beam. We believe this is due to imperfections in our beam.

4. Signal Processing

In embodiments, machine-learning model 510 uses outputs of a signal processing algorithm that includes of two modules: signal conditioning and angular velocity prediction. The conditioning step begins by first identifying which portions of the signal, e.g., time-varying electrical signal 132, contain information from a particle transiting the interference pattern of probe beam 102. Only small portions of the signal (bursts) contain information, e.g., bursts 202. These bursts result from the transit of a particle through the probe beam. In an example signal processing scheme, we first isolate these bursts and then parameterize them by fitting with multiple Gaussian functions. The resulting parameters are examples of fit parameters 508, and are used as the inputs for machine-learning model 510, which predicts the angular velocities and orbit radii of the trajectories of the particles. In embodiments, ML model 510 is pre-trained using data generated via the simulations described in Sec. 2.

The present section outlines the signal conditioning applied to the all of the data, and includes details of the burst detection scheme and a multi-Gaussian fit step. In embodiments, experimental and simulated data for model development or evaluation is processed identically following the steps outlined here. We close this section with a discussion of the architecture of an embodiment of machine-learning model 510.

4.1 Signal Conditioning

The time series data associated with these experiments represents time-varying electrical signal 132, and is both intermittent and aperiodic because particles transit the beam unpredictably while the data acquisition system runs continuously. The challenge is to first determine which portions of the time series correspond to bursts (transits of scattering particles through the beam) and then to extract information from these bursts by parameterizing them.

4.1.1 Burst Detection

A particle passing through interference fringes—such as fringes of plots 710, 720, and 730) scatters light proportionally to the intensity of the light incident on the particle. When the particle is positioned within a null of the interference pattern, no light is scattered. Therefore, a burst may contain valleys of only noise between high intensity regions. Consequently, bursts cannot be detected directly with a zero-crossing algorithm, as this may errantly split a single burst into many. In embodiments, signal conditioning includes convolving the signal with a rect function whose width is greater than the expected duration of the longest null. In embodiments, a crossing algorithm to determine when a burst starts and finishes by comparing this smoothed copy of the signal to a threshold set by the convolution of the rect with a portion of the signal that consists of only noise. Cross-correlation signal 302, multi-window function 304, and threshold 308 of FIG. 3 are respective examples of the smoothed signal, the rect function, and the threshold.

To ensure we select the entirety of the burst without clipping any information, buffering regions, referred to as tails herein, may be added to the beginning and end of each burst. Though these tails contain little or no information about particle movements, they can have an influence on the burst parameterization. To prevent artifacts from the burst detection scheme in later stages of the analysis, the tail durations of each burst are selected at random within a range that keeps the tail small relative to the total burst duration.

4.1.2 Multi-Gaussian Fits

Once we identify the bursts, we parameterize them to summarize their dominant features for use as inputs to the machine-learning model, which is an example of machine-learning model 510. The parameterization described in this section is an example of block 502 of method 500. In embodiments, the time series of the burst itself could be directly input to the ML model. However, this approach was highly sensitive to the length of the tails of the burst that contain little or no information. Therefore, we used a curve fitting scheme to parametrize and extract the features from the burst.

One parameterization strategy that is commonly used by optical sensors involves using a Fourier decomposition. However, such an approach proved futile here because the bursts have relatively little periodic behavior. Moreover, sinusoidal basis functions are continuous in time, whereas the bursts are discrete and localized in time. Due to the periodic nature of Fourier decompositions, such a parameterization would have a strong dependency on the length of the tails of the bursts. Therefore, we opted for an alternative parameterization technique that incorporates basis functions that trend to zero away from their maxima, more closely resemble the bursts, and deemphasize the lengths of the burst tails.

This technique parameterizes the bursts with a sum of multiple Gaussian functions and a small vertical offset, which allows for noise. Noting that a burst corresponding to a single pass of a particle through the interference pattern should contain no more peaks than petals in the interference pattern, we sum up to 2l (in this example, 2l=8) of these Gaussian functions with equation (4.1).

$$y = h + \sum_{n=1}^{2l} A_n \exp\left[\frac{(\mu_n - t)^2}{\sigma_n^2}\right] \quad (4.1)$$

Figure 10:
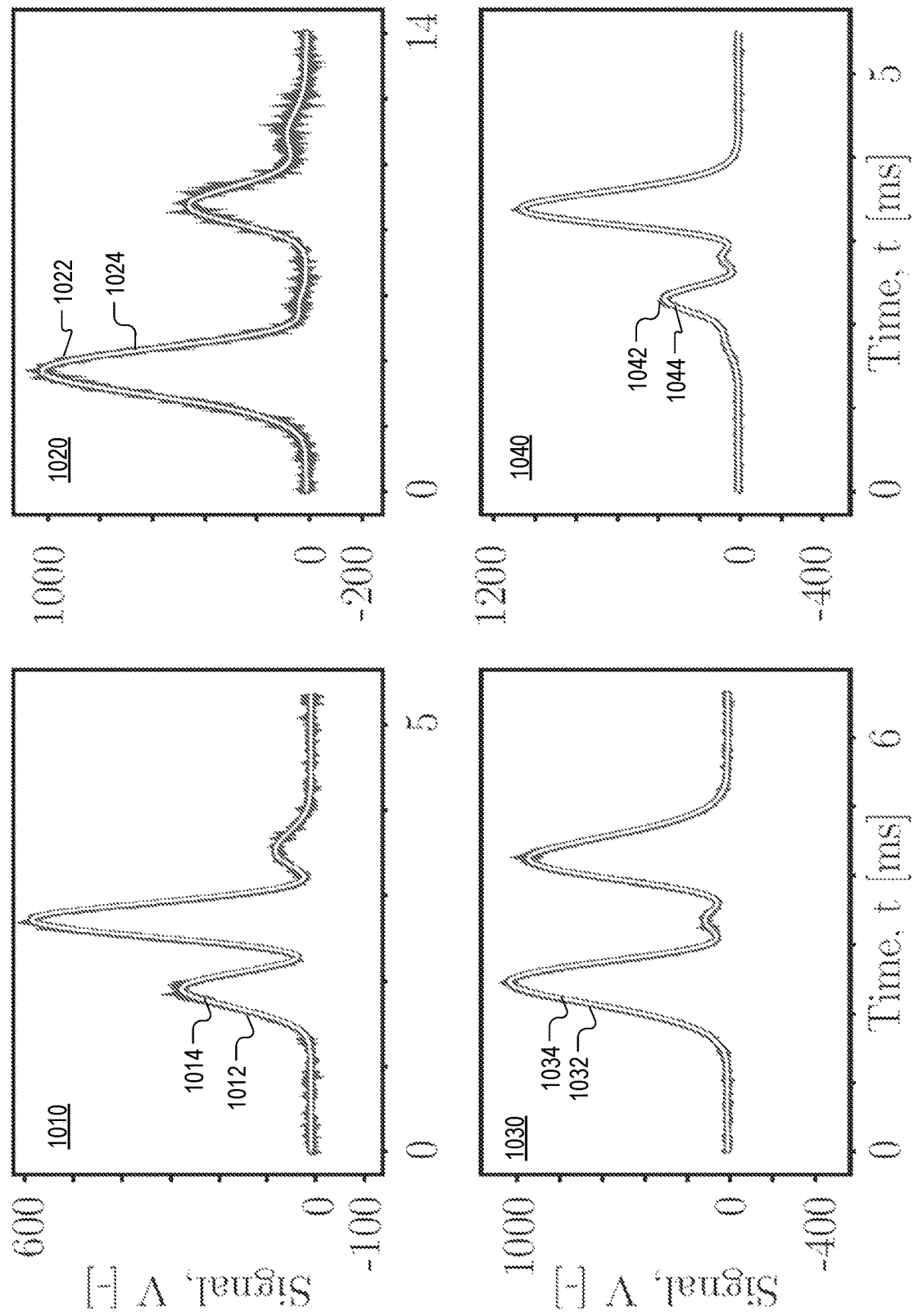
FIG. 10 depicts fitted curves to time-varying electrical signals generated by the structured-light velocimeter of FIG. 1.

In equation (4.1), sum of Gaussian functions, A, μ, and σ are the amplitude, temporal offset, and width of the Gaussian functions, respectively, and h is a vertical offset. Examples of bursts fit in this way are shown in FIG. 10. We note that alternative orthogonal decompositions with compact support like wavelet transforms might also provide a means for this processing step.

FIG. 10 depicts graphical illustrations of bursts parameterized by fitting Eq. (4.1) to them. FIG. 10 includes plots 1010, 1020, 1030, and 1040 showing respective signals, signals 1012, 1022, 1032, and 1042, and respective fitted curves to these signals determined using Eq. (4.1): fitted curves 1014, 1024, 1034, and 1044. Parameters for bursts in plots 1010, 1020, 1030, and 1040 are Ω, R, D, and φ. Respective values of each of these parameters are, for plots 1010-1040: Ω=284.4, 100.4, 346.3, 268.5 rad/sec, R=535.9, 435.9, 312.1, 608.2 pixels, D=362.5, 391.0, 379.7, 670.9 pixels, and φ=0.64, 0.51, 0.76, 0.94 rad. In all cases, r=20 pixels and l=±4. These parameters are examples of fit parameters 508, FIG. 5.

Gaussian functions do not form an orthogonal basis, so a great deal of care was taken to ensure that the parameterizations converged to realistic and physical solutions. In embodiments, curve fits are performed sequentially on each burst. The vertical offset may be initialized as the noise level of the signal. In embodiments, a peak finding algorithm identifies the number and locations of the local maxima of the burst. In embodiments, when there are fewer than 2l peaks, the first fit is conducted with Gaussian functions positioned at each maximum. These Gaussian functions each have an amplitude A equal to the difference of the burst value at that position and the noise level, and widths a calculated to be one-tenth of a rect-effective width of the signal. In embodiments, the rect-effective width of the signal is calculated by numerically integrating the difference between the signal and the noise level, then dividing this quantity by the maximum amplitude of the difference between the signal and the noise level.

Fits were weighted with smoothed copies of the bursts (e.g., cross-correlation signal 302) to emphasize the portions corresponding to the signal while simultaneously deemphasizing the tails. In embodiments, when the residuals between the resulting fit and the signal were greater than a threshold set by 110% of the noise level, a new fit is conducted, this time with a new Gaussian function at the position of the residual with the largest magnitude. As before, the previously placed Gaussian functions were located at the peak positions with parameters set by the peak at that location. The newest Gaussian function was at this point permitted to have a negative amplitude. In embodiments, this process is iterated until either the magnitude of the residuals was smaller than the noise floor, or until more than 2l Gaussian functions were necessary. Though in some cases the Gaussian functions were found to have significant overlap to characterize a single peak in the burst, we set the threshold to be equal to the number of petals in the interference pattern (2l, which equals 8 in the example of FIG. 10) based on the intuition that the signal would not have more peaks than petals. In embodiments, when more than eight Gaussian functions are needed to parameterize the signal, or if the fits failed to converge at any step, the burst is eliminated. In an example result approximately 80% of the bursts had fits that converged with 8 or fewer Gaussian functions in the parameterization. The remaining 20% of the bursts, which appeared to have no common features with each other, were discarded.

4.2 Predicting Angular Velocity and Orbit Radius with a Machine-Learning Model The angular velocity prediction described in this section is an example of block 504, method 500. A machine-learning regression algorithm enables discernment correlations between the angular velocities of the rotating particles and parameterizations of their resulting bursts. In embodiments, machine-learning model 510 is built using APIs from the open source software libraries Keras and TensorFlow. The model is a sequential model with two densely connected layers that use the rectified linear unit (ReLU) nonlinearity and an output layer that returns two continuous values, angular velocity $\Omega$ and arc radius R. In embodiments, predictions of arc radius R are included in the quantities the machine-learning model predicts, even when the predictions have large uncertainties, because they improve the fidelity of predictions of angular velocity $\Omega$.

As an input, the machine-learning model takes the parameters of the bursts described above, as well as several additional parameters characterizing the duration of the burst and the quality of the fit. The amplitudes $A_n$ of each burst are normalized to the largest $A_n$ of the burst. This also serves to permit fluctuations in the intensity of the probe beam on time scales longer than the duration of the burst. To remove the influence of the tail length, the temporal offsets $\mu_n$, are referenced to the earliest $\mu_n$, parameterizing the burst.

In embodiments, to ensure all parameters are equally represented in the machine-learning model and to stabilize the training, each variable is independently scaled to approximately the same range ([0,100]) based on the minimum and maximum expected values based on the properties of the experiment and the flow. Identical normalizing factors were used in model training and evaluation. In embodiments, the machine-learning model has 6,210 trainable parameters that are trained by minimizing the mean square error using the RMSprop optimizer. To avoid overfitting, the machine-learning model may be trained with an EarlyStopping callback that halts the training when little improvement is seen in the validation error.

In embodiments, training data is also augmented by fitting up to three copies of each burst, each padded with tails of different length. In the example described herein, in total, 83,885 parameterizations of 51,182 bursts are used to train the model. These bursts correspond to simulations conducted with the following parameters: 300≤D [pixels]≤700, 100≤R [pixels]≤920, 50≤$\Omega$[rad/sec]≤1040, $\pi/8$≤$\phi$[rad] $3\pi/8$.

5. Results and Discussion

Figure 11:
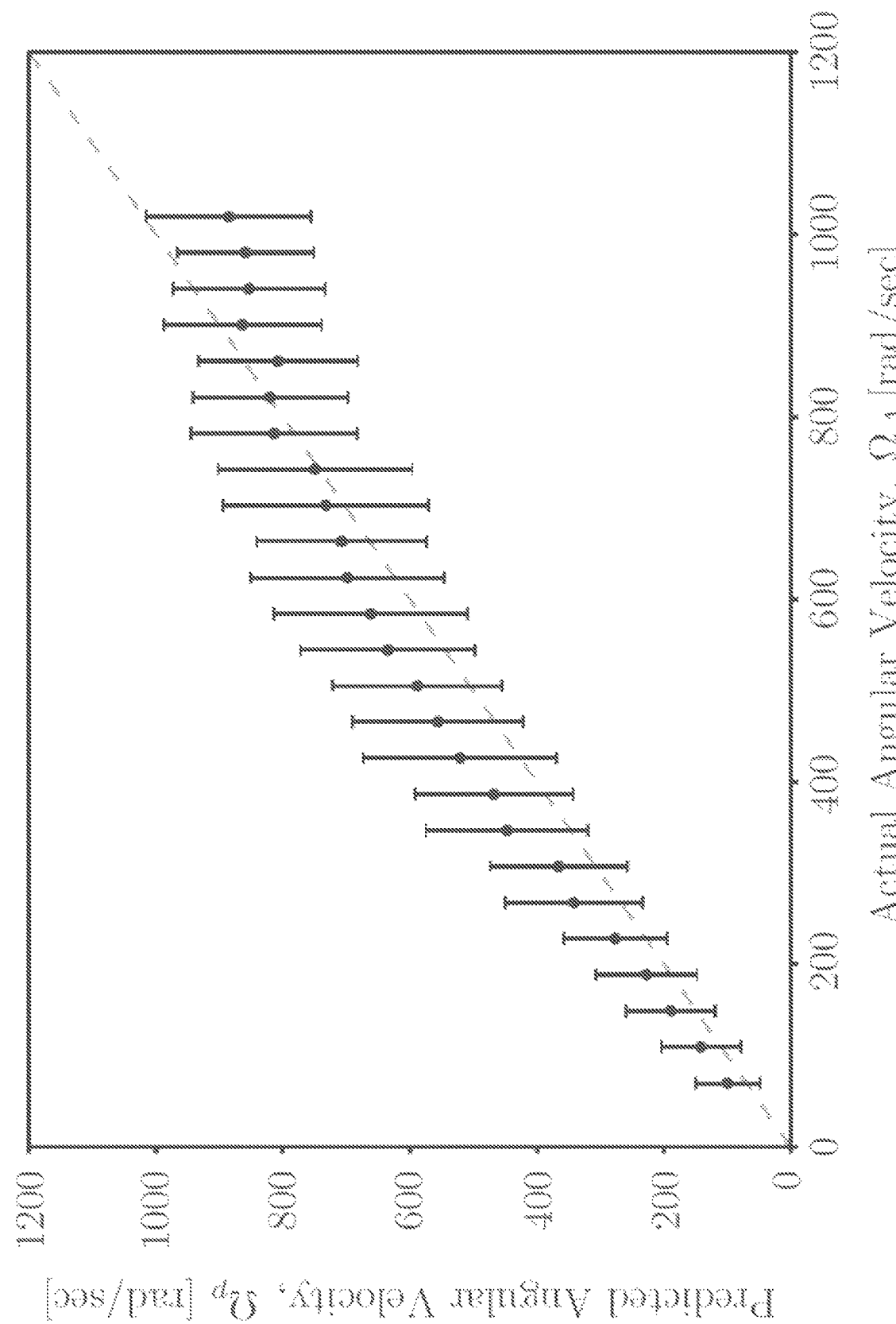
FIG. 11, which is a plot of angular velocity, as predicted by an embodiment of the structured-light velocimeter of FIG. 1, as a function of the actual angular velocity.

Once the machine-learning model was trained, it was evaluated with a second set of parameterizations of 2,948 bursts selected independently and at random within the same parameter range as the training set. The results are shown in FIG. 11, which is a plot of the predicted angular velocity $\Omega_p$, as a function of the actual angular velocity $\Omega_A$. The results are binned into 25 angular velocity partitions of width 39.5 rad/sec. Each of the 2,948 bursts have varying R, $\phi$, D, and $\Omega$ sampled in the ranges described in the text are used to evaluate the machine-learning model. The mean (closed circles) and standard deviation (uncertainty bars) of predicted angular velocities are plotted for each of the 25 partitions. Each partition contains predictions for more than 70 bursts.

This velocimeter has a dynamic range of 50≤$\Omega_A$ [rad/sec] ≤800, wherein $\Omega_p$ scales linearly with $\Omega_A$. The limit of linearity of the velocimeter beyond which this velocimeter no longer provides useful predictions of $\Omega_A$ is $\Omega_A$≈800 rad/sec.

Within the dynamic range of the velocimeter, the mean measured $\Omega_p$ is biased and systematically overpredicts $\Omega_A$; however, this effect may be calibrated by subtracting the average bias from the prediction since the model is evaluated with "known" simulated reference standards. In this demonstration, we forgo such a calibration step in an effort to emphasize the ML component of the signal processing algorithm. After such a calibration step, the resulting predictions would still retain the dispersion shown in FIG. 11 but with no bias. We define the measurement uncertainty as the standard deviation of the angular velocity predictions within each angular velocity prediction since this dispersion relates directly to the quality of the measurement. As indicated with uncertainty bars in FIG. 11, the measurement uncertainty is a function of $\Omega_A$, but is no more than 162 rad/sec for $\Omega_A$≤800 rad/sec. The uncertainties are, on average, ±14% for each burst.

Figure 12:
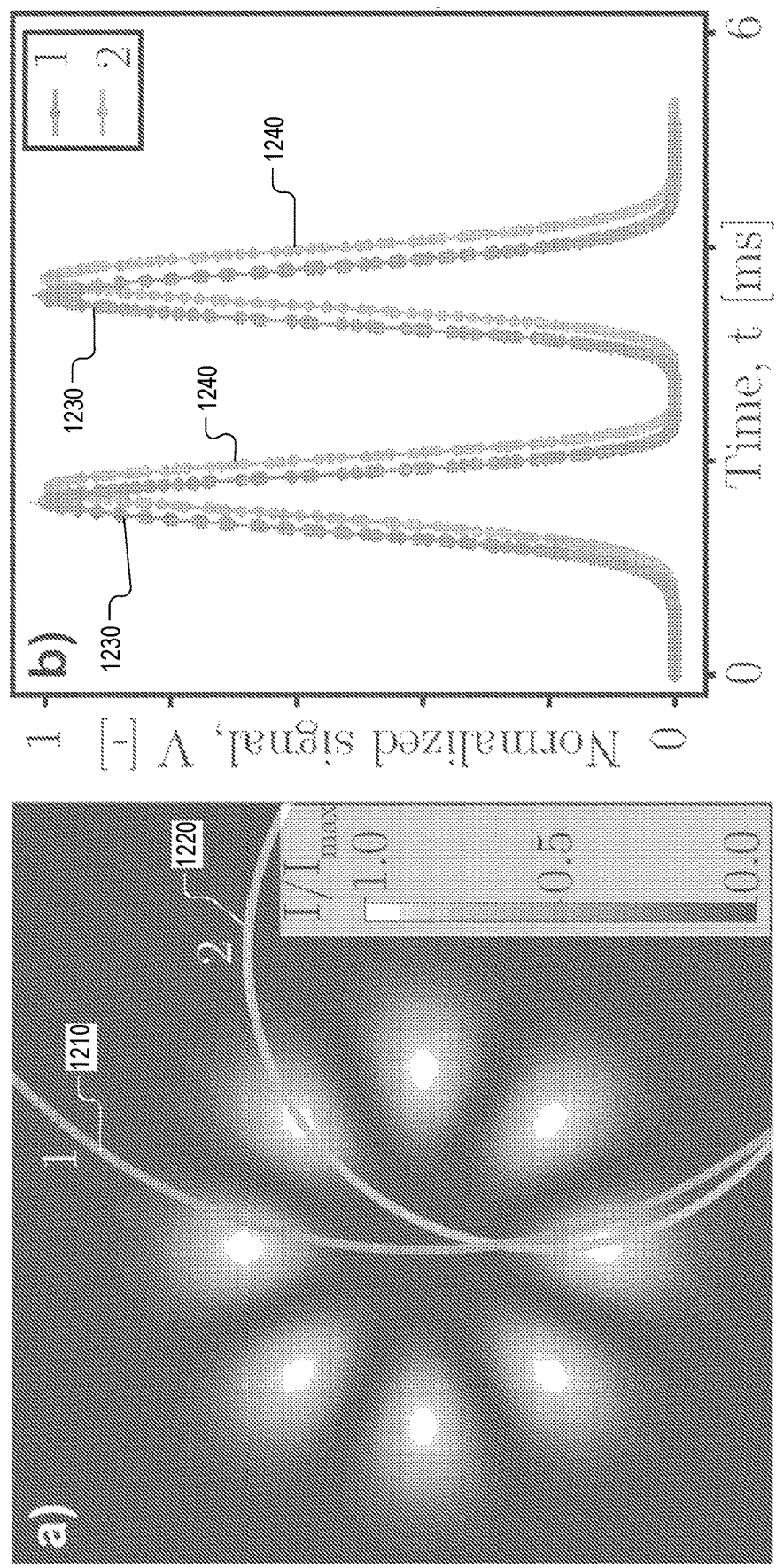
FIG. 12 illustrates how to certain particles having different orbit centers, orbit radii, and angular velocities yield nearly identical bursts.

We expect that the uncertainty discussed above has two dominant sources, (1) the geometry of the velocimeter, and (2) burst parameterizations. In the first case, the radial symmetry of the probe beam and the circular trajectories of the scattering particles can conspire to generate very similar bursts with multiple parameter combinations. An example of this situation is illustrated in FIG. 12, where the simulated trajectories 1210 and 1120 of particles with different orbit centers, orbit radii, and angular velocities are shown to yield respective bursts 1230 and 1240 that are almost identical. Given the parameterization of one such burst, the model may ascribe an incorrect angular velocity to the burst is not uniquely generated by one set of values of the underlying parameters. The other dominant source of uncertainty arises as a consequence of the non-orthogonal basis functions used to fit the burst: many parameterizations of the same burst exist.

Simulated particle trajectory 1210 is characterized by angular velocity $\Omega$=600 rad/sec and radius R=426 pixels. Simulated particle trajectory 1210 is characterized by angular velocity $\Omega$=312.5 rad/sec and radius R=220 pixels. Bursts 1230 and 1240 are respective a simulated time series for particle trajectories 1210 and 1220 each normalized by its maximum value. Bursts 1230 and 1240 are temporally offset by 0.12 milliseconds for clarity. Parameters for trajectories 1210, 1220 are: D=425, 238 pixels and $\phi$=0.393, −0.005 rad. In both cases, r=20 pixels and l=±4.

In this proof-of-concept demonstration, we have chosen to sacrifice uncertainty for simplicity. Nonetheless, we have identified several ways to reduce the uncertainty of the measurements. In embodiments, the contribution to the uncertainty from the non-orthogonal basis functions can be refined by training, evaluating, and using the model with multiple parameterizations of each burst. One approach to improve the uncertainty of the velocimeter due to the geometry is to first determine which bursts can be generated by more than one set of orbit centers, orbit radii, and angular velocities, and then to exclude these bursts from analysis by preventing their use in training the model and by rejecting them from being evaluated by the model. An alternate approach is to limit the parameter range used to train the model to a narrow window centered about the expected flow conditions.

A different strategy to improve the uncertainty of these measurements is to modify the illumination beam, optimizing it so that non-unique signals are not generated in the first place. In embodiments, better spatially structured beams could be optimized to augment angular velocity predictions. For example, an asymmetric pattern may be used to reduce the set of possible parameter combinations that can generate any given signal and to disambiguate direction. Further direction disambiguation could be accomplished by structuring the polarization field.

In this study, we have fixed the size of the scattering particle with a radius r=20 pixels. Recalling that the scattering particle acts as a blurring filter, changing its size to smooth different amounts of the beam may serve as a means for tuning the uncertainties discussed above. Likewise, increasing l might reduce the number of non-unique bursts.

When using this velocimeter in a flow that evolves more slowly than the time it takes to conduct multiple measurements, the uncertainty of the angular velocity may be further refined with a statistical treatment of the predicted angular velocities using a Student's t-test, for example, since the distributions of $\Omega_P$ about $\Omega_A$ are well approximated with normal distributions.

Embodiments disclosed herein include a velocimeter and associated structured-light-velocimetry method that predicts the angular velocity of a particle traveling on a circular orbit using a machine learning approach to develop a model to relate parameterizations of a signal to the angular velocity. This method particularly effective in predicting the angular velocities of small particles traveling on circular orbits, where no one-to-one relationship existed between characteristics of the scattered light signal and the spatial pattern of the illuminating beam.

6. Current Velocimeter Limitations

In embodiments, velocimeter 600 is capable of measuring the angular velocities of particles moving only along arcs with radii below a critical radius set by the size of the interference patterns. Next, we discuss the minimum and maximum angular velocities we expect the velocimeter to be able to resolve. Additionally, we describe the spatial and temporal resolutions of the velocimeter. Then, we touch on the physical limitations that set the beam size and the particle size. Finally, we discuss how this measurement has no depth resolution.

6.1 Orbits Require Curvature Through Interference Fringes

Figure 13:
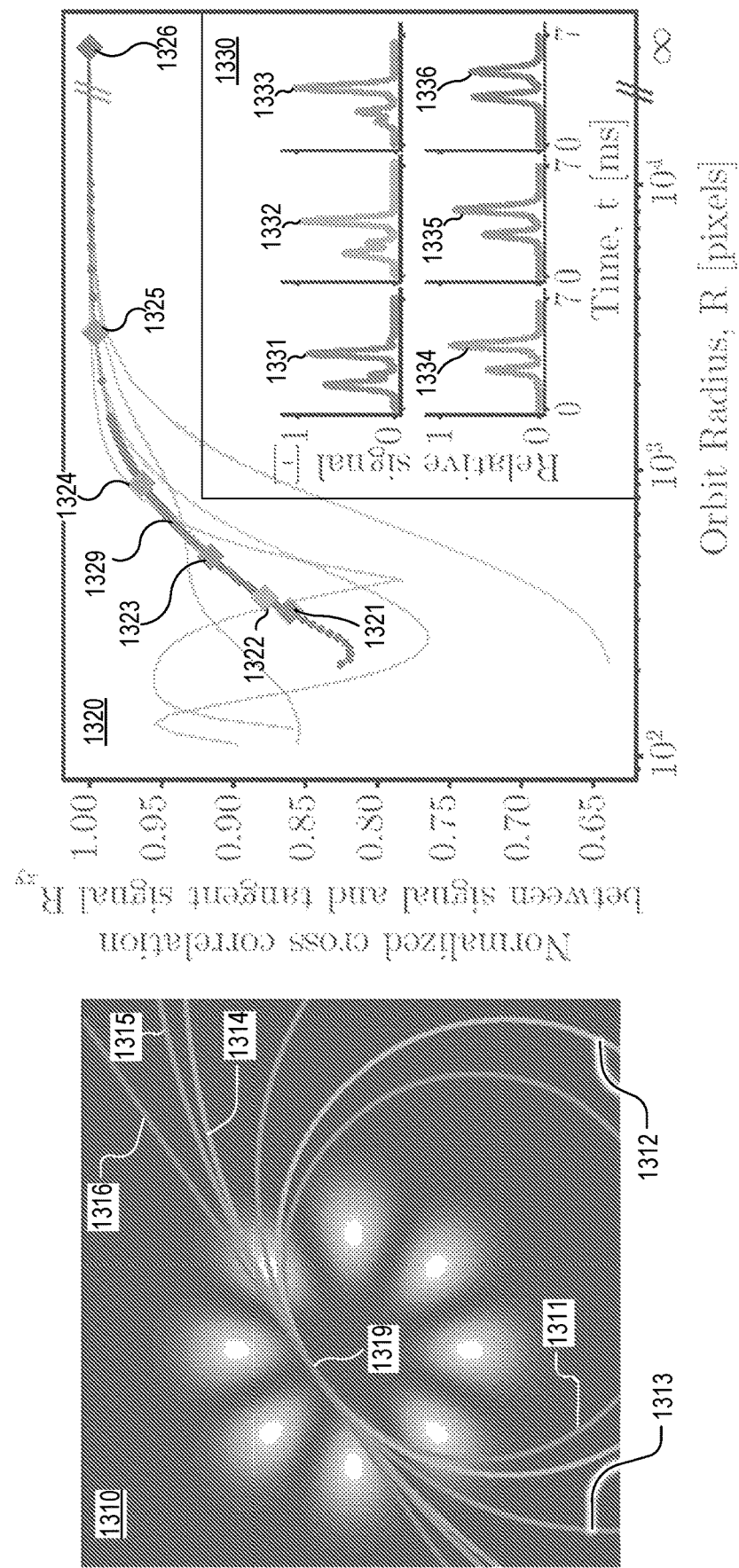
FIG. 13 illustrates the sensitivity of the time-varying electrical signal generated by the structured-light velocimeter of FIG. 1 to orbit radius of a tracer particle, in embodiments.

As the orbit radius R grows large relative to the interference fringes, $R \gg w_0 \sqrt{l+1}/2$, the particle trajectory becomes increasingly well approximated using the first order, straight line tangent to the arc. We call this trajectory R. This concept is illustrated in plot 1310 of FIG. 13, which depicts particle trajectories of several radii, all passing through the same point with the same tangent velocity, $V=2\pi R\Omega$. As R grows, much of the particle trajectory through the interference fringes mimics that of the tangent, and only as the particle first enters and finally exits the interference fringes do deviations of the trajectory from that of the tangent appear. FIG. 13 also includes plot 1320, has an inset 1330. Inset 1330 shows time series that correspond to the trajectories plotted in plot 1310. We see that as the orbit radius approaches the tangent line (R–00), the signals converge.

Plot 1310 includes trajectories 1311-1316 that have respective orbit-radii R=[200, 260, 400, 900, 1210, ∞] and intersect at a common point 1319. Inset 1330 includes time series 1331-1336, which correspond to respective trajectories 1311-1316. As the orbit radius R grows, the trajectory of a particle moving through the interference fringes approaches that of the tangent to the arc. All arcs pass through (50,5706), and all arcs share the same tangent, which is linear trajectory 1316.

Plot 1320 shows normalized cross correlation $R_{xy}$ between each signal and its corresponding tangent. Each cross-correlation curve of plot 1320 corresponds to $R_{xy}$ for sets of arcs passing through several randomly chosen different common points. Cross-correlation curve 1329 corresponds to common point 1319 illustrated in plot 1310. Points 1321-1326 on curve 1329 correspond to trajectories 1311-1316, respectively.

When $R > R_c$, where $R_c$ is the critical orbit radius above which curvature in the trajectory is negligible, the values of R and Ω become ambiguous. That is, the tangent velocity could be the product of any $R > R_c$ with a compensating angular velocity 12 to yield V. Therefore, we expect our velocimeter to function only for $R < R_c$.

The specific value of $R_c$ is a function of r, l, $w_0$, D, and φ. Instead of calculating $R_c$ we use the normalized cross correlation $R_{xy}$ defined in Eq. (3.1) to compare bursts from a set of simulated particle trajectories that pass through the same point within the interference pattern but have orbits with different R to the burst corresponding to the tangent trajectory through the common point. In this normalized cross correlation, x and y represent time series corresponding to the trajectories with orbit radius R and $R_\infty$ respectively. To facilitate this comparison, all particles pass through the common point with the same tangent velocity V calculated as $V=\Omega/(2\pi R)$ for $R \neq R_\infty$. Because the orbit curvature of particles on transits with $R > R_c$ is negligible through the interference pattern, the normalized cross correlation of bursts corresponding to these conditions with the burst of the tangent case is close to 1. The influence of nonnegligible orbit curvature manifests as a difference in the beginnings and ends of a burst and results in a normalized cross correlation less than 1. The results of this comparison are shown in plot 1320 as a function of R. To emphasize the strong dependence of this function on D and φ, $R_{xy}$ is plotted for several different common points with different tangent angles. We define $R_c$ as the radius at which $R_{xy}$ is greater than 0.98. In the case of the data shown in FIG. 13, $R_c \approx 1000$ pixels.

In principle, the angular velocity of a measurement that predicts $R > R_c$ should not be accepted because of the ambiguity between $R > R_c$ and Ω discussed above. To avoid needing to reject measurements in our proof-of-concept velocimeter demonstration, we estimate that $R_c$ 1000 pixels at every point, and we use only R<1000 pixels in both the training and test data to eliminate any trajectories that might resemble the tangent trajectory.

6.2 Velocimeter Resolution

As the angular velocity increases, the number of sampled points per burst decreases for a fixed sampling rate. With fewer data points, the number of degrees of freedom in the burst parameterization fits decreases. As the number of degrees of freedom decreases, so too does the quality of the fit. At a minimum, these fits require the same number of points as there are parameters, which is 3×2l+1=25 when l=4. However, we found that when bursts had fewer than approximately fifty points, the fitting scheme was sensitive to noise in the burst. Therefore, we established a criterion for selecting fits for use in training or testing the machine-learning model that controlled the quality of the fit, accepting fits only if their coefficient of determination $r^2 > 0.9$, meaning that the model explained more than 90% of the variation in the burst. For a given trajectory, increasing the sampling frequency increases the number of points in the burst, so the angular velocity range can be tuned by modifying the sampling frequency.

The temporal resolution of each measurement is given by the duration of the burst: $\delta t = t_{burst}$. An upper limit of the time resolution can be estimated from the time it takes a particle orbiting with the smallest angular velocity along the smallest orbit to traverse the widest portion of the beam, $\delta t_{max} \approx 2r_p/$ (RΩ). Example values of $t_{burst}$ are on the order of 10 milliseconds. Increasing the angular velocity refines the temporal resolution.

We define the spatial resolution ox of the velocimeter to be the distance between the probe beam and the center of orbit of the particle. Given a particular center of orbit (D, ϕ), δx is limited by $D-r_p-r<δx<D+r_p+r$ since only orbits that transit the beam are measurable. The upper limit of the spatial resolution is approximated by $δx_{max} \approx D_{max}+r_p+r$, where $D_{max}$ denotes the furthest center of orbit from the beam of light about which particles traverse the beam on trajectories with $R<R_c$. The spatial resolutions of the example bursts described above are approximately $δx_{max} \approx 1500$ pixels=1.45 cm.

6.3 Physical Limitations to Probe Size

In this demonstration, we have fixed the sizes of both the particle and the interference pattern while we have varied the other parameters with the goal of predicting the angular velocity and the orbit radius of a particle embedded in the flow. However, both the particle size and the interference pattern size can be changed.

As in other velocimetry sensors that use scattering particles, particle radii r should be set by the parameters of the flow such that the particles are neither too small to have motion dominated by Brownian motion nor too large to carry enough inertia to travel along paths that are not fluid pathlines.

The scattered light must have ample power to be distinguished from noise by the detector. This power is limited by the intensity of the incident beam, which, given a laser source can be limited by two factors, the efficiency of reshaping the Gaussian intensity profile from the laser to the requisite LG modes, and the ultimate size of the beam. When an LG beam is generated from a beam with a Gaussian intensity profile and a fixed beam waist $w_0$ using an SLM as was done herein, the efficiency of the diffraction gratings decreases as l increases due to the decreasing spatial overlap between the input and desired mode. The transverse spatial extent of the generated LG beam may be altered using a telescope setup after the SLM. As the size of the beam increases, its total power remains constant, so the power incident on the scattering particle diminishes.

We expect that the smallest beam size possible is limited by the visibility of the fringes, the ratio of the intensities of the radial peaks and nulls. As the beam size decreases past approximately the wavelength of the light, this visibility decreases, and the fringes appear to bleed into one another. We expect this decreased visibility to directly impact the velocimeter resolution by decreasing the sizes of the features in the bursts.

The ratio of the particle size to interference pattern sizes is very important to the behavior of this velocimeter. Recall that the particle acts as a blurring function on the interference fringes. If the size of the particle is such that it occupies one fringe and one null of the interference pattern, one can imagine how moving the particle through an intensity peak, into an intensity null, and back through a different intensity peak would decrease the contribution to the blurred intensity from the waning edge while symmetrically increasing the contribution to the blurred intensity from the waxing edge, resulting in little signal modulation.

6.4 Depth of Measurement

In embodiments, velocimeter 600 has longitudinal sensitivity, that is, the scattered light contains information regarding the depth of the particle. In such embodiments, confocal sectioning geometry is incorporated into the probe beam by relating the absolute scattered intensity to the absorption of the fluid that scales linearly with depth according to Beer's Law, or by selectively seeding the flow.

7. Conclusion and Future Work

Embodiments of velocimeters and velocimetry methods disclosed herein use structured light and machine learning to predict flow properties. The embodiments can calculate the angular velocity of particles traveling in a 2D flow along circular arcs by analyzing the intensity of the light they scatter. No simple mapping from the spatial pattern of the light and characteristics of the signal exists for predicting the angular velocity with embodiments of velocimeter 600. However, as discussed herein a machine-learning regression model trained on simulations of the expected scattered light was capable of predicting the angular velocities of scattering particles to within uncertainties of, on average, ±14%.

Section 2 herein presents a mathematical model we implemented to simulate the expected signals. Section 3 describes idealized experiments to validate the simulations. Section 4 details a signal parameterization approach, noting that because the Gaussian basis functions we used were not orthogonal, the resulting parameters had strong dependencies on how our fits were initialized. Consequently, the ML model was trained using particular instances of many possible parameters. Because the ML model was able to handle this variability, we suspect that embodiments of velocimeter 600 would still function in more complex experimental environments that may induce random intensity fluctuations in the resulting signals. Such effects might mirror the effect of the non-orthogonal basis functions, both inducing a degree of variability on the output parameters. Here, by using non-orthogonal basis functions, we artificially introduce variability into the ML model, and we suspect that this facilitates studying noisier signals.

There remain ample opportunities for refining this velocimeter. In embodiments, ML model 510 returns a probability distribution of the possible angular velocities instead of a single value. Because the uncertainties associated with non-unique bursts arising from the multiple parameter configurations like that illustrated in FIG. 12 are restricted to quantized values, the outputs of such a model could be compared to physical intuition or multiple measurements to refine the selected angular velocity.

Velocimeter 600 predicts the angular velocities of particles traveling on circular orbits in a plane orthogonal to the probe beam. In embodiments, velocimeter 600 allows for this plane to be positioned at a different angle relative to the beam. When the beam and the plane of orbit were not orthogonal, the particle would no longer appear to travel with a circular orbit and would instead take an elliptical trajectory through the beam. In such embodiments, the longitudinal Doppler shift of the scattered light may be incorporated into the ML model 510.

In embodiments, velocimeter 600 measures angular accelerations in addition to, or instead of, angular velocity. For example, velocimeter 600 may measure angular acceleration when the particle accelerated on, or faster than, a time scale set by the residence time (the time the particle is in the probe volume), $\tau \approx 2r_p/U_\perp$, where $U_\perp = \Omega R$. While the rotational Doppler shift has been used to measure angular accelerations by creating spectrograms that monitor the frequency shift as a function of time, adapting such a paradigm to the present measurement scenarios would be challenging due to the short expected residence times. Expanding the parameter space of machine-learning model 510 to include accelerating particle trajectories might be a more viable strategy. According, in embodiments, the parameter space of machine-learning model 510 includes accelerating particle trajectories.

In cases of simple motion like particles moving in straight lines or particle orbiting about a known point on circular trajectories, structured probe beams can be engineered that yield readily interpretable signals. Here, we have attempted to address the question of what are we to do when the motion we expect is more complicated. In particular, we have studied particles that orbit according to circular trajectories, but these orbits are not concentric with the probe beam. Embodiments of velocimeter 600 measures the angular velocities of particles obeying such circular trajectories offset from the probe beam axis. We have accomplished this by developing a more sophisticated signal processing strategy, e.g., method 500. We have shown that, even if the motion and the structure of the light no longer match, a history of the particle's kinematic information can be revealed from the information encoded in the signal. However, we have found that a new form of uncertainty that previously did not exist is present in this more general case because signals may no longer uniquely correspond to the parameters of interest.

As we noted above, this uncertainty can be overcome by excluding signals like those shown in FIG. 12 known to have multiple possible origins, by refining the machine-learning model, or by illuminating the flow with multiple, potentially multiplexed, light patterns. However, if there does not exist a single pattern of structured light that can provide signals that are easy to interpret, it is unclear whether some optimal probe beam structure exists.

To begin to offer an answer to this question, we draw an analogy to the field of compressive sensing. A major finding that has propelled the field of compressive sensing in recent years is that samples of sparse signals collected as the inner product of random vectors with the signal can, with high probability, reconstruct the signal nearly perfectly. This is because sampling randomly in this way spreads the information contained in the signal efficiently across many of the measurements. Accordingly, embodiments include illuminating fluid 118 with probe beam 102 in which probe beam 102 has a known but random structure of light, which may encode bursts with more information by which to identify the parameters that generated them. Ultimately, combining such an illumination pattern with a machine-learning-based signal processing scheme might facilitate more precise measurements.

Angular Velocity and Vorticity

Particles orbiting a point move according to two modes: solid body rotation flow and free vortex flow. In the former case, the orientation of the particle (the direction the particle points) remains fixed about the center of rotation throughout the trajectory of the particle. In the latter case, the orientation of the particle remains unchanged relative to a stationary point as the particle moves. In these cases, the steady state angular velocities of the particle about the axis of rotation can be expressed as $\vec{\Omega}=[0,0,\Omega]^T$ and $\vec{\Omega}=[0,0,\alpha r^{-2}]^T$, respectively, where $\Omega$ is the angular velocity, $\alpha$ is a constant, and $r$ is the orbit radius. The vorticity is calculated as the curl of the velocity, $\vec{\omega}=\vec{\nabla}\times\vec{U}$, where the velocity is given by $\vec{U}=\vec{\Omega}\times\vec{r}$ given the particle position $\vec{r}$. Consequently, whereas the vorticity of the solid body rotation mode is $\vec{\omega}=2\vec{\Omega}$, the vorticity of the free vortex mode is identically $\vec{\omega}=\vec{0}$.

Embodiments of velocimeter 600 correlate the scattered-light burst generated from the pathline of a scattering particle traveling through the probe beam. If this pathline is curved, the certain embodiments of velocimeter 600 cannot distinguish if the curvature is due to solid body rotation or free vortex flow.

Just as curved pathlines do not necessarily imply nonzero vorticity, nonzero vorticity does not necessarily imply that the pathlines are necessarily curved. For example, shear flows like one with a velocity profile given by $\vec{U}=[\beta x_2, 0,0]$ where the velocity in the $\hat{x}_1$ direction depends linearly on the $\hat{x}_2$ position scaled with a constant have straight pathlines in the $\hat{x}_1$ direction but nonzero vorticity: $\vec{\omega}=[0,0,-\beta]$.

In fluid mechanics, vorticity is commonly interpreted as twice the local angular velocity. Angular velocities measured by embodiments velocimeter 600 here cannot be interpreted as local angular velocities from which vorticity fields can be deduced but are rather the angular velocities of the tracer particles about their orbit centers. Therefore, such measurements of angular velocity should not be used to calculate vorticity. However, we note that there does exist a special case in which vorticity can be deduced from these measurements: when the system is known to be rotating exclusively according to the solid body rotation mode.

Features described above as well as those claimed below may be combined in various ways without departing from the scope hereof. The following enumerated examples illustrate some possible, non-limiting combinations.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combinations of Features

Features described above as well as those claimed below may be combined in various ways without departing from the scope hereof. The following enumerated examples illustrate some possible, non-limiting combinations.

(A1) A structured-light-velocimetry method includes (i) extracting one or more bursts from a time-varying signal generated by detecting scattered light from a tracer particle passing through a structured optical beam; (ii) fitting each of the one or more bursts to a multi-variable model to extract a plurality of fitted parameters; and (iii) executing a machine-learning model with the plurality of fitted parameters to predict an angular velocity of the tracer particle.

(A2) Embodiments of method (A1) further outputting the predicted angular velocity.

(A3) In embodiments of either of methods (A1) and (A2), said extracting including: (i) cross-correlating the time-varying signal with a reference function to obtain a cross-correlation signal; (ii) comparing the cross-correlation signal to a threshold to identify one or more burst start times and one or more corresponding burst end times; and (iii) cropping the time-varying signal based on the one or more burst start times and the one or more corresponding burst end times.

(A4) In embodiments of method (A3), the reference function is either a rectangular function or a triangular function.

(A5) In embodiments of any one of methods (A1)-(A4), the multi-variable model includes one or more peaks, and the plurality of fitted parameters include a center, a width, and an amplitude for each of the one or more peaks.
(A6) In embodiments of method (A5), the plurality of fitted parameters further including a single offset.
(A7) In embodiments of any one of methods (A1)-(A6), the machine-learning model is a neural network.
(A8) Embodiments of any one of methods (A1)-(A7) further include generating the time-varying signal by detecting the scattered light from the tracer particle.
(A9) Embodiments of method (A8) further include injecting the tracer particle into the structured optical beam.
(A10) Embodiments of either one of methods (A8) and (A9) further comprising generating the structured optical beam by interfering Laguerre-Gauss beams with orbital angular mode numbers +1 and −1.
(B1) A structured-light velocimeter includes a processor and a memory. The memory is communicatively coupled with the processor and stores machine-readable instructions that, when executed by the processor, control the structured-light velocimeter to execute any one of methods (A1)-(A10).
(B2) Embodiments of structured-light velocimeter (B1) further include an optical detector configured to detect the scattered light. In such embodiments, the memory further storing additional machine-readable instructions that, when executed by the processor, control the structured-light velocimeter to receive the time-varying signal from the optical detector.
(B3) Embodiments of either one of structured-light velocimeter (B1) and (B2) further include optics configured to transform an output of a laser into the structured optical beam by interfering Laguerre-Gauss beams with orbital angular mode numbers +1 and −1.
(B4) Embodiments of any one of structured-light velocimeters (B1)-(B3) further include the laser.

REFERENCES

[1] A. Belmonte, C. Rosales-Guzman, and J. P. Tones, "Measurement of flow vorticity with helical beams of light," Optica 2(11), 1002-1005 (2015).
[2] A. Ryabtsev, S. Pouya, A. Safaripour, M. Koochesfahani, and M. Dantus, "Fluid flow vorticity measurement using laser beams with orbital angular momentum," Opt. Express 24(11), 11762-11767 (2016).

What is claimed is:
1. A structured-light-velocimetry method, comprising:
extracting one or more bursts from a time-varying signal by:
  (i) cross-correlating the time-varying signal with a reference function to obtain a cross-correlation signal;
  (ii) comparing the cross-correlation signal to a threshold to identify one or more burst start times and one or more corresponding burst end times; and
  (iii) cropping the time-varying signal based on the one or more burst start times and the one or more corresponding burst end times;
  the time-varying signal having been generated by detecting scattered light from a tracer particle passing through a structured optical beam;
fitting each of the one or more bursts to a multi-variable model to extract a plurality of fitted parameters; and
executing a machine-learning model with the plurality of fitted parameters to predict an angular velocity of the tracer particle.
2. The structured-light-velocimetry method of claim 1, further comprising outputting the predicted angular velocity.
3. The structured-light-velocimetry method of claim 1, the reference function being either a rectangular function or a triangular function.
4. The structured-light-velocimetry method of claim 1, wherein the multi-variable model includes one or more peaks, and the plurality of fitted parameters include a center, a width, and an amplitude for each of the one or more peaks.
5. The structured-light-velocimetry method of claim 4, the plurality of fitted parameters further including a single offset.
6. The structured-light-velocimetry method of claim 1, the machine-learning model being a neural network.
7. The structured-light-velocimetry method of claim 1, further comprising generating the time-varying signal by detecting the scattered light from the tracer particle.
8. The structured-light-velocimetry method of claim 7, further comprising injecting the tracer particle into the structured optical beam.
9. The structured-light-velocimetry method of claim 7, further comprising generating the structured optical beam by interfering Laguerre-Gauss beams with orbital angular mode numbers +1 and −1.
10. A structured-light velocimeter, comprising:
a processor; and
a memory communicatively coupled with the processor and storing machine-readable instructions that, when executed by the processor, control the structured-light velocimeter to:
  extract one or more bursts from a time-varying signal by:
    (i) cross-correlating the time-varying signal with a reference function to obtain a cross-correlation signal,
    (ii) comparing the cross-correlation signal to a threshold to identify one or more burst start times and one or more corresponding burst end times, and
    (iii) cropping the time-varying signal based on the one or more burst start times and the one or more corresponding burst end times,
    the time-varying signal having been generated by detecting scattered light from a tracer particle passing through a structured optical beam,
  fit each of the one or more bursts to a multi-variable model to extract a plurality of fitted parameters, and
  execute a machine-learning model with the plurality of fitted parameters to predict an angular velocity of the tracer particle.
11. The structured-light velocimeter of claim 10, the memory storing additional machine-readable instructions that, when executed by the processor, control the structured-light velocimeter to output the predicted angular velocity.
12. The structured-light velocimeter of claim 10, the reference function being either a rectangular function or a triangular function.
13. The structured-light velocimeter of claim 10, the multi-variable model including one or more peaks, and the plurality of fitted parameters include a center, a width, and an amplitude for each of the one or more peaks.
14. The structured-light velocimeter of claim 13, wherein the plurality of fitted parameters further includes a single offset.

15. The structured-light velocimeter of claim 10, the machine-learning model being a neural network.

16. The structured-light velocimeter of claim 10,
further comprising an optical detector configured to detect the scattered light;
the memory further storing additional machine-readable instructions that, when executed by the processor, control the structured-light velocimeter to receive the time-varying signal from the optical detector.

17. The structured-light velocimeter of claim 10, further comprising optics configured to transform an output of a laser into the structured optical beam by interfering Laguerre-Gauss beams with orbital angular mode numbers +1 and −1.

18. The structured-light velocimeter of claim 17, further comprising the laser.

\* \* \* \* \*